United States Patent
Kanda et al.

(10) Patent No.: US 10,868,953 B2
(45) Date of Patent: Dec. 15, 2020

(54) IMAGE PROCESSING DEVICE CAPABLE OF NOTIFYING AN EFFECT OF EMPHASIZING A SUBJECT BEFORE PERFORMING IMAGING, CONTROL METHOD THEREOF, AND MEDIUM

(71) Applicant: CANON KABUSHIKI KAISHA, Tokyo (JP)

(72) Inventors: Akihiko Kanda, Kawasaki (JP); Yoshihito Tamaki, Yokohama (JP); Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 16/150,375

(22) Filed: Oct. 3, 2018

(65) Prior Publication Data

US 2019/0109996 A1  Apr. 11, 2019

(30) Foreign Application Priority Data

Oct. 11, 2017 (JP) ................. 2017-198015

(51) Int. Cl.
 *G03B 7/091*  (2006.01)
 *G03B 7/095*  (2006.01)
(Continued)

(52) U.S. Cl.
 CPC ....... *H04N 5/232123* (2018.08); *G03B 7/091* (2013.01); *G03B 7/095* (2013.01);
(Continued)

(58) Field of Classification Search
 CPC ........ G03B 13/18; G03B 7/091; G03B 7/095; G06T 1/0007; G06T 5/003; G06T 5/50;
(Continued)

(56) References Cited

U.S. PATENT DOCUMENTS

| 4,410,804 A | 10/1983 | Stauffer |
| 2008/0107350 A1* | 5/2008 | Guichard ........... H04N 5/23212 382/255 |

(Continued)

FOREIGN PATENT DOCUMENTS

| EP | 1 085 751 A2 | 3/2001 |
| JP | 2001-083407 A | 3/2001 |
| JP | 2011-022796 A | 2/2011 |

*Primary Examiner* — Yubin Hung
(74) *Attorney, Agent, or Firm* — Cowan, Liebowitz & Latman, P.C.

(57) ABSTRACT

An image processing device is provided that includes: an acquisition unit that acquires a plurality of viewpoint images which are captured at a plurality of different viewpoints by an imaging unit; a detection unit that detects viewpoint-relevant information between the plurality of viewpoint images; a determination unit that determines a second imaging condition in which image change between before and after predetermined image processing is greater than that in a first imaging condition in which the plurality of viewpoint images are captured on the basis of the first imaging condition and the viewpoint-relevant information; and an output unit that outputs the second imaging condition determined by the determination unit.

18 Claims, 21 Drawing Sheets

(51) Int. Cl.
  *G06T 5/50*    (2006.01)
  *H04N 5/232*   (2006.01)
  *G03B 13/18*   (2006.01)
  *G06T 1/00*    (2006.01)
  *G06T 5/00*    (2006.01)
  *H04N 5/369*   (2011.01)

(52) U.S. Cl.
  CPC ............ *G03B 13/18* (2013.01); *G06T 1/0007* (2013.01); *G06T 5/003* (2013.01); *G06T 5/50* (2013.01); *H04N 5/23219* (2013.01); *H04N 5/23293* (2013.01); *H04N 5/23296* (2013.01); *H04N 5/232122* (2018.08); *H04N 5/232127* (2018.08); *H04N 5/36961* (2018.08)

(58) Field of Classification Search
  CPC ..... G06T 1/003; G06T 1/50; H04N 5/232122; H04N 5/232123; H04N 5/232127; H04N 5/23219; H04N 5/23293; H04N 5/23296; H04N 5/39361
  See application file for complete search history.

(56) References Cited

U.S. PATENT DOCUMENTS

| | | | | |
|---|---|---|---|---|
| 2008/0240701 | A1* | 10/2008 | Kusaka | G03B 13/36 396/104 |
| 2013/0258170 | A1* | 10/2013 | Tamaki | G02B 7/32 348/349 |
| 2015/0156430 | A1* | 6/2015 | Ishiga | H04N 5/357 348/241 |
| 2015/0185585 | A1* | 7/2015 | Kawai | H04N 5/3696 348/333.11 |
| 2016/0234429 | A1* | 8/2016 | Cho | G06T 1/0014 |

* cited by examiner

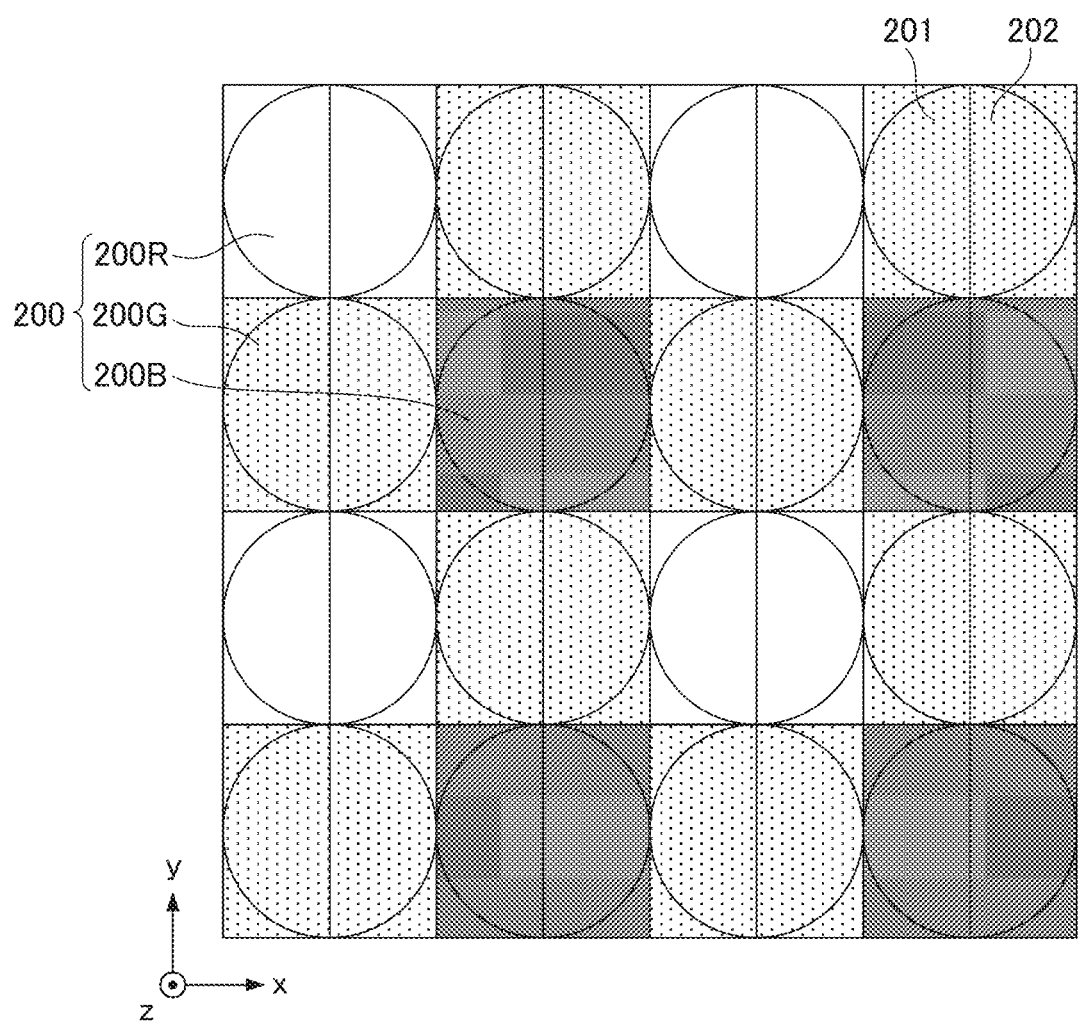

FOCAL POSITION

IMAGE PROCESSING DEVICE CAPABLE OF NOTIFYING AN EFFECT OF EMPHASIZING A SUBJECT BEFORE PERFORMING IMAGING, CONTROL METHOD THEREOF, AND MEDIUM

BACKGROUND OF THE INVENTION

Field of the Invention

The present invention relates to an image processing device and a control method for the image processing device.

Description of the Related Art

An image-forming plane phase difference method of performing focus detection in a phase difference manner using focus detection pixels formed in an imaging element is known as a focus detection method of an imaging device. An imaging device disclosed in U.S. Pat. No. 4,410,804 employs a two-dimensional imaging element in which one microlens and a plurality of separate photoelectric conversion portions are formed for each pixel. The divided photoelectric conversion portions are configured to receive light through different areas of an exit pupil of an imaging lens via a single microlens and split the pupil. The separate photoelectric conversion portions generates viewpoint signals from signals received thereby, calculates an image shift value from a parallax between a plurality of viewpoint signals, and converts the image shift value into a defocus value, whereby phase difference type focus detection is performed. Japanese Patent Application Laid-Open No. 2001-083407 discloses that an imaging signal is generated by adding a plurality of viewpoint signals generated by a plurality of divided photoelectric conversion portions having received light.

However, in imaging with a camera, an imaging expression of effectively emphasizing a main subject by focusing on the main subject and blurring a foreground or a background is often used. Since an effect of emphasizing a main subject may not be clear depending on imaging conditions, the effect has to be confirmed by processing an image after the imaging.

SUMMARY OF THE INVENTION

The invention provides an image processing device that can notify whether there is an effect of emphasizing a subject close to a focal point in contrast with a blurred foreground or background before performing imaging.

An image processing device according to the present invention is provided that includes: an acquisition unit that acquires a plurality of viewpoint images which are captured at a plurality of different viewpoints by an imaging unit; a detection unit that detects viewpoint-relevant information between the plurality of viewpoint images; a setting unit that sets a first imaging condition and a second imaging condition which are imaging conditions of the plurality of viewpoint images, and a notification unit that notifies a user of the second imaging condition when the second imaging condition has been set by the setting unit, the second imaging condition is set on the basis of the first imaging condition and the viewpoint-relevant information, and image change between before and after predetermined image processing is greater in the second imaging condition than that in the first imaging condition.

According to the invention, it is possible to provide an image processing device that can notify whether there is an effect of emphasizing a subject close to a focal point in contrast with a blurred foreground or background before performing imaging.

Further features of the present invention will become apparent from the following description of exemplary embodiments (with reference to the attached drawings).

BRIEF DESCRIPTION OF THE DRAWINGS

FIG. 3 is a diagram schematically illustrating a pixel array.

DESCRIPTION OF THE EMBODIMENTS

Hereinafter, exemplary embodiments of the invention will be described with reference to the accompanying drawings and the like. In the following description, the invention is applied to a digital camera that can acquire LF (Light Field) data as an example of an image processing device. However, the invention is not limited to a digital camera and can also be applied to an arbitrary device that can process acquired LF data. Examples of such a device include a mobile phone, a game machine, a tablet terminal, a personal computer, a wristwatch type or spectacle type information terminal, a surveillance system, an onboard system, a medical system such as an endoscope, and a robot that can provide an image. A configuration in which an arbitrary device transmits LF data and operation details to a server (which includes a virtual machine) including processing means such as a processor over the Internet or a local network and the server executes some or all of processes on the LF data may be employed. In this case, the arbitrary device may have a configuration in which process results are received from the server and are displayed.

First Embodiment (Entire Configuration of Digital Camera 100)

Figure 1:
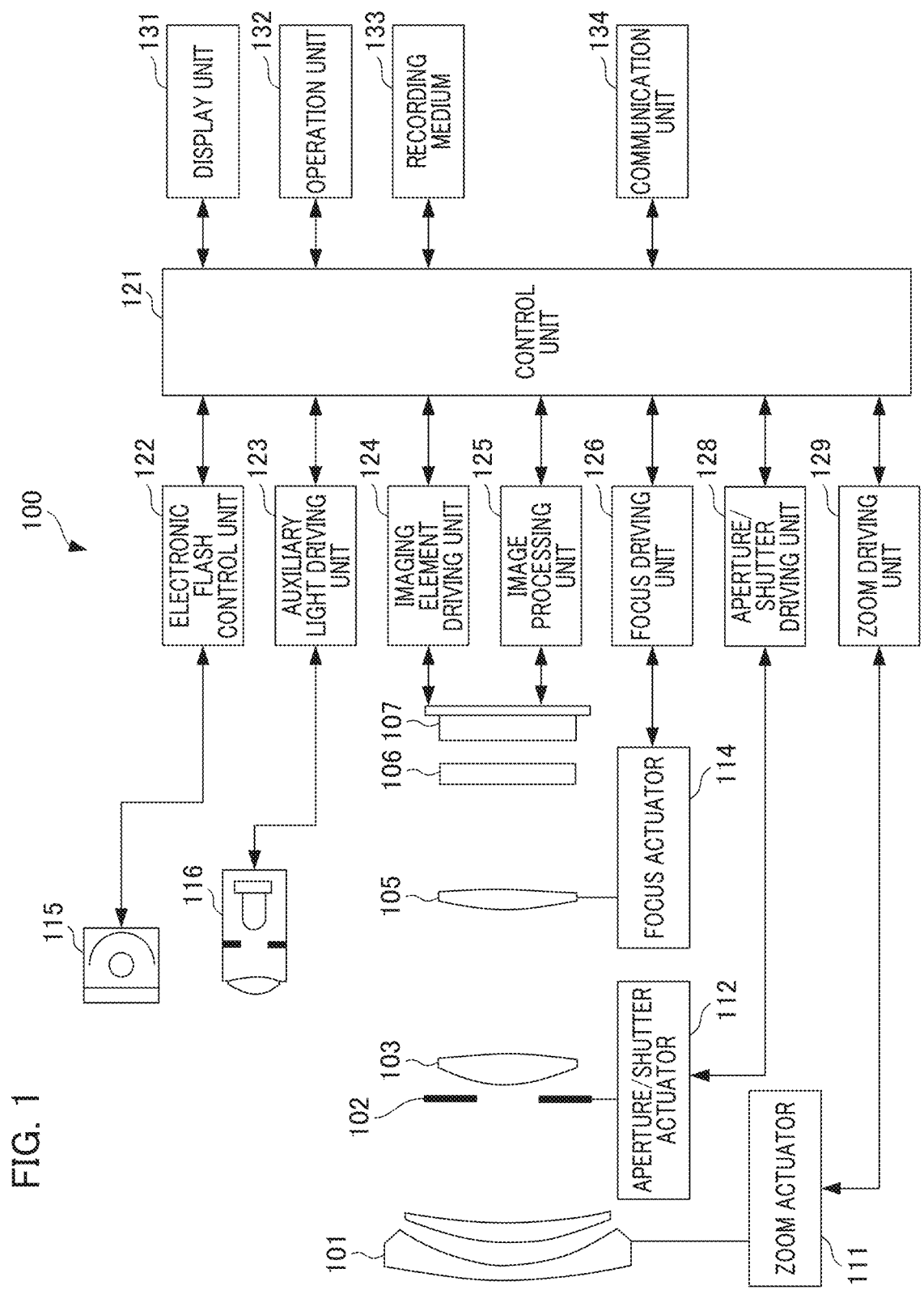
FIG. 1 is a block diagram illustrating an example of a functional configuration of a digital camera as an image processing device.

FIG. 1 is a block diagram illustrating an example of a functional configuration of a digital camera 100 as an example of an image processing device according to a first embodiment. One or more of functional blocks illustrated in FIG. 1 may be embodied by hardware such as an ASIC or a programmable logic array (PLA) or may be embodied by causing a programmable processor such as a CPU or a MPU to execute software. Some or all of the functional blocks may be embodied in a combination of software and hardware. Accordingly, in the following description, different functional blocks described as operation entities may be embodied by the same hardware as one entity.

A first lens group 101 includes a zoom lens constituting an image-forming optical system, is disposed at a tip of the image-forming optical system, and is maintained to be movable forward and backward in an optical axis direction. A shutter 102 includes an aperture stop and adjusts an amount of light which is incident on an imaging element 107 at the time of imaging by adjusting an aperture diameter of the aperture stop. When a still image is captured, the shutter 102 serves as a shutter that adjusts an exposure time. The shutter 102 and a second lens group 103 constituting the image-forming optical system move forward and backward in the optical axis direction as a unified body and realize a magnification changing operation (a zoom function) by cooperating with the forward and backward movement of the first lens group 101.

A third lens group 105 includes, for example, a focusing lens constituting the image-forming optical system and performs focus adjustment with forward and backward movement in the optical axis direction. An optical element 106 includes an optical low-pass filter and reduces false color or moire of a captured image. An imaging element 107 includes an imaging element including, for example, a CMOS photosensor and a peripheral circuit and is disposed on an image-forming plane of the image-forming optical system.

A zoom actuator 111 includes a driver that causes forward and backward movement of the first to third lens groups 101 to 103 and causes the first to third lens groups 101 to 103 to move forward and backward in the optical axis direction by rotating a cam barrel which is not illustrated. An aperture/shutter actuator 112 includes a driver that causes the shutter 102 to operate and controls an aperture diameter or a shutter operation of the shutter 102 under the control of an aperture/shutter driving unit 128. A focus actuator 114 includes a driver that causes the third lens group 105 to move forward and backward, and causes the third lens group 105 to move forward and backward in the optical axis direction to perform focus adjustment.

A lighting device 115 includes an electronic flash lighting a subject at the time of imaging and is, for example, a flash lighting device using a xenon tube or a lighting device including an LED which continuously emits light. An auxiliary light emitting unit 116 includes an AF auxiliary light emitting device, and projects an image of a mask with a predetermined opening pattern onto a subject system via a transmission lens to improve focus detection capability for a dark subject or a low-contrast subject.

A control unit 121 includes a CPU (or an MPU), a ROM, and a RAM and controls the units of the digital camera 100 such that a sequence of operations such as AF, imaging, image processing, and recording is performed by loading and executing a program in the ROM into the RAM. The control unit 121 may include an A/D converter, a D/A converter, and a communication interface circuit. The control unit 121 also has a function of a display control unit that controls display contents to be displayed on a display unit 131, and serves as an imaging condition setting unit such that the control unit 121 performs setting and changing of the imaging condition and outputs results to the display unit 131. The control unit 121 may perform processes which are performed by an image processing unit 125 instead thereof.

An electronic flash control unit 122 includes a control circuit or a control module and controls lighting of the lighting device 115 in synchronization with an imaging operation. An auxiliary light driving unit 123 controls lighting of the auxiliary light emitting unit 116 in synchronization with a focus detecting operation. An imaging element driving unit 124 controls an imaging operation of the imaging element 107, converts acquired image signals in an A/D conversion manner, and transmits the resultant signals to the control unit 121. A drive mode includes a mode in which a plurality of viewpoint images are output and a mode in which one viewpoint image is acquired. The image processing circuit 125 performs processes such as conversion, color interpolation, and JPEG compression on an image acquired by the imaging element 107.

A focus driving unit 126, an aperture/shutter driving unit 128, and a zoom driving unit 129 each include a control circuit or a control module. The focus driving unit 126 controls the focus actuator 114 on the basis of the focus detection result. The aperture/shutter driving unit 128 controls the aperture/shutter actuator 112 at a predetermined time of an imaging operation. The zoom driving unit 129 controls the zoom actuator 111 according to a zooming operation by a user.

The display unit 131 includes a display device such as an LCD, and displays, for example, information on an imaging mode of the camera, a preview image before imaging, a confirmation image after imaging, and a display image in a focused state at the time of focus detection. The display unit 131 also displays set values or changed values of an imaging condition in the control unit 121. The operation unit 132 includes a group of switches for operating the digital camera 100 and includes, for example, a power switch, a release (imaging trigger) switch, a zoom switch, and an imaging mode selection switch. When the operation unit 132 transmits a user's operation input thereto to the control unit 121, the control unit 121 controls the units of the digital camera 100 such that an operation corresponding to the user's operation is performed. The recording medium 133 includes, for example, a detachable flash memory and records a captured image.

A communication unit 134 includes a communication circuit or module, and sets up communication with an external device (for example, a server installed outside) using a communication method based on a predetermined standard. The communication unit 134 performs, for example, uploading or downloading of image data and reception of results of predetermined processes which are performed on uploaded image data by an external device in cooperation with the external device.

Figure 2:
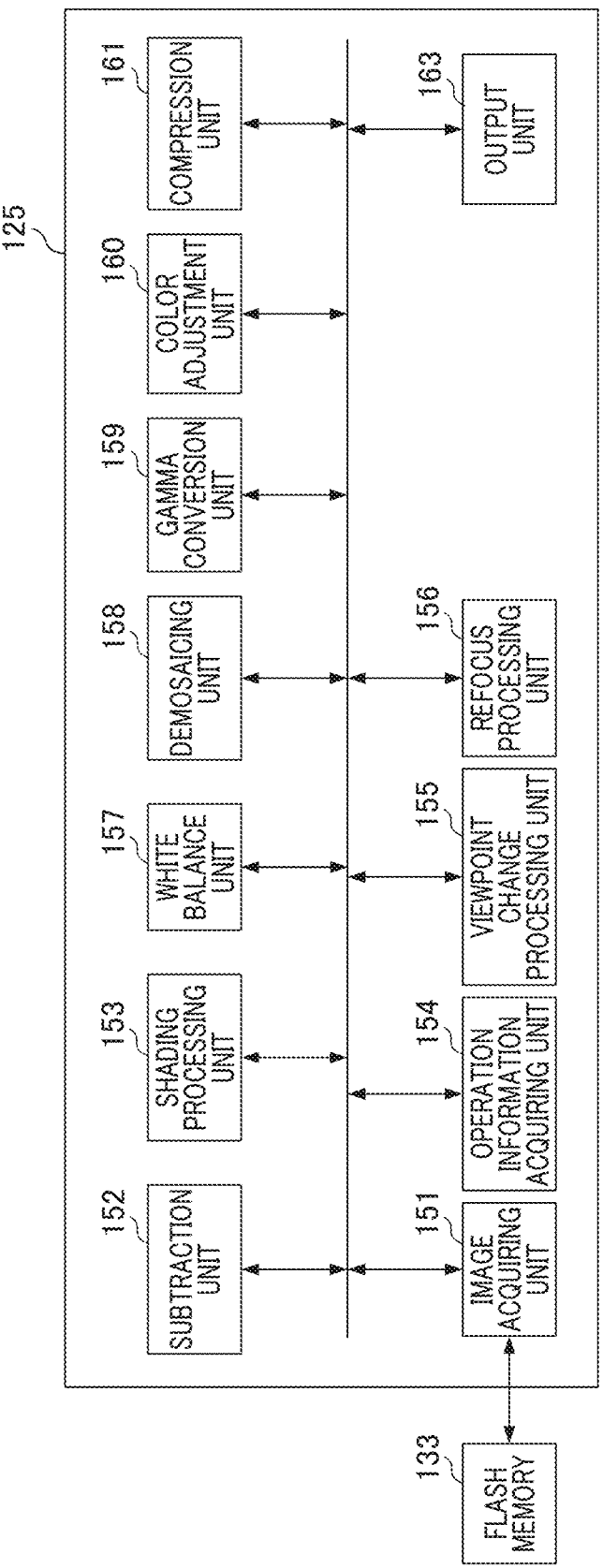
FIG. 2 is a block diagram illustrating an example of a functional configuration of an image processing unit.

The configuration of the image processing unit 125 will be described below with reference to FIG. 2. An image acquiring unit 151 stores image data read from the recording medium 133. A combined image data is image data including an image (also referred to as an A+B image) into which a first viewpoint image and a second viewpoint image which will be described later are combined and the first viewpoint image.

A subtraction unit 152 generates the second viewpoint image by subtracting the first viewpoint image from the A+B image. A shading processing unit 153 corrects a variation in an amount of light depending on resolutions of the first viewpoint image and the second viewpoint image. An operation information acquiring unit 154 receives adjustment values for viewpoint movement and refocusing which are changed by a user and supplies the adjustment values input by the user to a viewpoint change processing unit 155 and a refocus processing unit 156.

The viewpoint change processing unit 155 as a viewpoint image processing means in this embodiment changes addition proportions (weights) of the first viewpoint image and the second viewpoint image and combines the images of which the viewpoint has changed. Although details will be described later, an image of which the depth of field has been enlarged or reduced can be generated through the processing of the viewpoint change processing unit 155. The refocus processing unit 156 as a viewpoint image processing means in this embodiment generates a combined image by shifting and adding the first viewpoint image and the second viewpoint image in a pupil split direction and generates an image at another focal position. The refocus processing unit 156 serves as a viewpoint information detecting means and generates a contrast distribution and an image shift distribution which are viewpoint-relevant information between viewpoint images. Details of the processing of the refocus processing unit 156 will be described later.

The image processing unit 125 performs a developing process (image processing) through the use of a white balance unit 157, a demosaicing unit 158, a gamma conversion unit 159, and a color adjustment unit 160 which will be described below. The white balance unit 157 performs a white balance process. Specifically, gains are set for the colors of R, G, and B such that R, G, and B in a white area are isochromatic. By performing the white balance process before the demosaicing process, it is possible to prevent a saturation from becoming higher than a saturation of false color due to color fogging and to prevent erroneous determination at the time of calculating the saturation.

The demosaicing unit 158 generates a color image including color image data of R, G, and B at all pixels by interpolating color mosaic image data of two colors among three primary colors which are missing in each pixel. The demosaicing unit 158 performs interpolation using neighboring pixels of a pixel of interest on the pixel of interest. Thereafter, color image data of the three primary colors of R. G, and B is generated as the interpolation process result for each pixel.

The gamma conversion unit 159 performs a gamma correction process on the color image data of each pixel and generates, for example, color image data matching display characteristics of the display unit 131. The color adjustment unit 160 performs, for example, various color adjustment processes such as noise reduction, saturation enhancement, hue correction, and edge reinforcement on the color image data as a process for improving an appearance of an image.

A compression unit 161 compresses the color image data of which colors have been adjusted using a method based on a predetermined compression method such as JPEG to reduce the data size of the color image data at the time of recording. An output unit 163 outputs the color image data, the compressed image data, or display data for a user interface.

(Configuration of Imaging Element 107)

An array of pixels and subpixels of the imaging element 107 according to this embodiment will be described below with reference to FIG. 3. FIG. 3 illustrates a pixel array in which pixels are arranged in a two-dimensional shape in a range of four columns×four rows and illustrates a subpixel array included in the pixels in a range of eight columns×four rows.

In a pixel group of two columns two rows in the pixel array illustrated in FIG. 3, a pixel 200R having a spectral sensitivity of R (red) is disposed at an upper-left position, pixels 200G having a spectral sensitivity of G (green) are disposed at upper-right and lower-left positions, and a pixel 200B having a spectral sensitivity of B (blue) is disposed at a lower-right position. Each pixel includes a subpixel 201 and a subpixel 202 which are arranged in two columns×one row.

By arranging a plurality of pixel arrays of four columns× four rows (subpixel arrays of eight columns×four rows) illustrated in FIG. 3 in a two-dimensional shape, it is possible to acquire a captured image (or a focus detection signal). In the imaging element 107, for example, a period P in which pixels are arranged is 4 µm, the number of pixels N is 5575 columns×3725 rows=about 20,750,000 pixels, a column period PS of subpixels is 2 µm, and the number of subpixels NS is 1150 columns×3725 rows=about 41,500, 000 pixels.

Figure 4A:
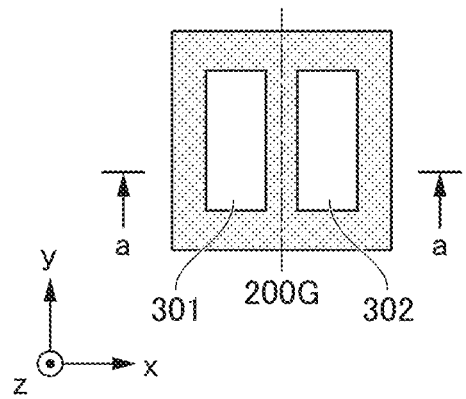
FIGS. 4A and 4B area plan view and a sectional view schematically illustrating a pixel.
Figure 4B:
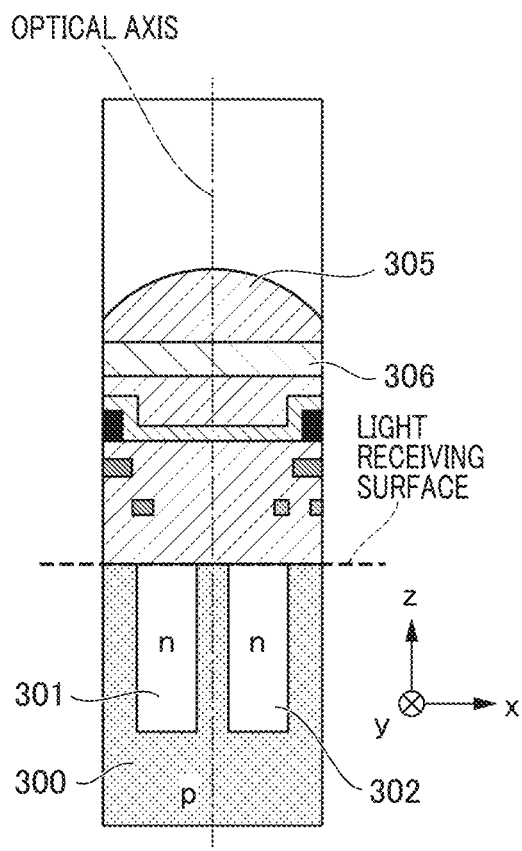

The structure of the pixel 200G illustrated in FIG. 3 will be described below in more detail. FIG. 4A is a plan view of the pixel 200G when seen from a light receiving surface side (the +z side) of the imaging element 107. FIG. 4B is a sectional view taken along line a-a in FIG. 4A when seen from the −y side. The pixel 200G includes a photoelectric conversion portion 301 and a photoelectric conversion portion 302 which are partitioned into NH parts (two parts) in the x direction and partitioned into NV parts (one part) in the y direction. The photoelectric conversion portion 301 and the photoelectric conversion portion 302 correspond to a subpixel 201 and a subpixel 202.

The pixel 200G includes a microlens 305 for collecting incident light on a light reception side (the +z direction) of the pixel, and a light flux incident through the microlens 305 is received by the photoelectric conversion portion 301 or the photoelectric conversion portion 302. The photoelectric conversion portion 301 and the photoelectric conversion portion 302 may be a pin-structured photodiode in which an intrinsic layer is interposed between a p-type layer and an n-type layer or may be a pn-junction photodiode from which the intrinsic layer is omitted if necessary. A color filter 306 is disposed between the microlens 305 and the photoelectric conversion portions 301 and 302 and passes light of a predetermined frequency. In FIG. 4B, an example in which one color filter 306 is provided for the pixel 200G is illustrated, but color filters having different spectral transmittance values may be provided for the subpixels or the color filter may be omitted.

In the photoelectric conversion portion 301 and the photoelectric conversion portion 302, electrons and holes are generated as pairs depending on an amount of light received and the pairs are decomposed in a depletion layer. Thereafter, electrons with negative charge are accumulated in the n-type layer, and holes are output to the outside of the imaging element 107 via the p-type layer 300 connected to a constant voltage source (not illustrated). Electrons accumulated in the n-type layers of the photoelectric conversion portion 301 and the photoelectric conversion portion 302 are transferred to a capacitive portion (FD) via a transfer gate and are converted into a voltage signal.

(Relationship Between Pixel Structure of Imaging Element 107 and Pupil Split)

Figure 5:
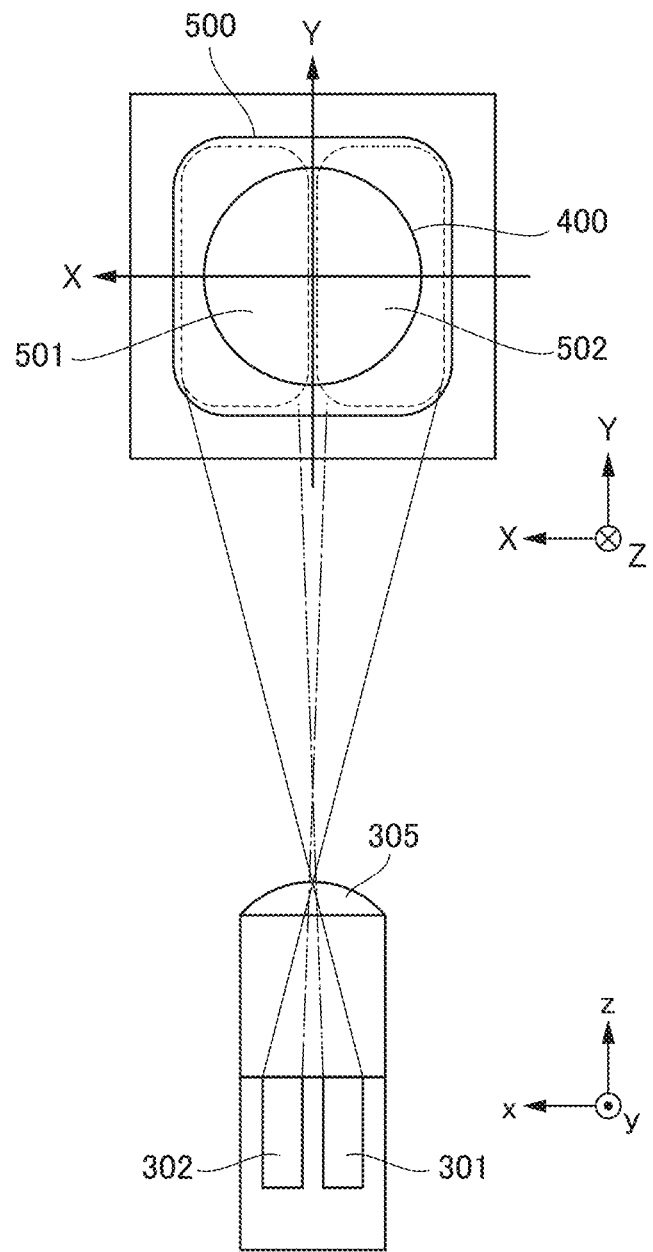
FIG. 5 is a diagram schematically illustrating pupil split.

A relationship between a pixel structure of the imaging element 107 and pupil split illustrated in FIGS. 4A and 4B will be described below with reference to FIG. 5. FIG. 5 illustrates a relationship between a sectional view taken along line a-a of the pixel 200G illustrated in FIG. 4A when seen from the +y side and an exit pupil surface of the image-forming optical system. In FIG. 5, for the purpose of correspondence to the coordinate system of the exit pupil surface, the x axis and the y axis of the sectional view of the pixel 200G are inverted with respect to FIGS. 4A and 4B.

A pupil subarea 501 of the subpixel 201 indicates a pupil area which can receive light in the subpixel 201. The center of gravity of the pupil subarea 501 of the subpixel 201 is eccentric to the +X side on the pupil surface, and is substantially conjugate with the light receiving surface of the photoelectric conversion portion 301 of which the center of gravity is eccentric in the −x direction due to the microlens.

On the other hand, a pupil subarea 502 of the subpixel 202 indicates a pupil area which can receive light in the subpixel 202. The center of gravity of the pupil subarea 502 of the subpixel 202 is eccentric to the −X side on the pupil surface, and is substantially conjugate with the light receiving surface of the photoelectric conversion portion 302 of which the center of gravity is eccentric in the +x direction by the microlens. The pupil area 500 is a pupil area which can receive light in the entire pixel 200G including the photoelectric conversion portion 301 and the photoelectric conversion portion 302 (the subpixel 201 and the subpixel 202).

Figure 6A:
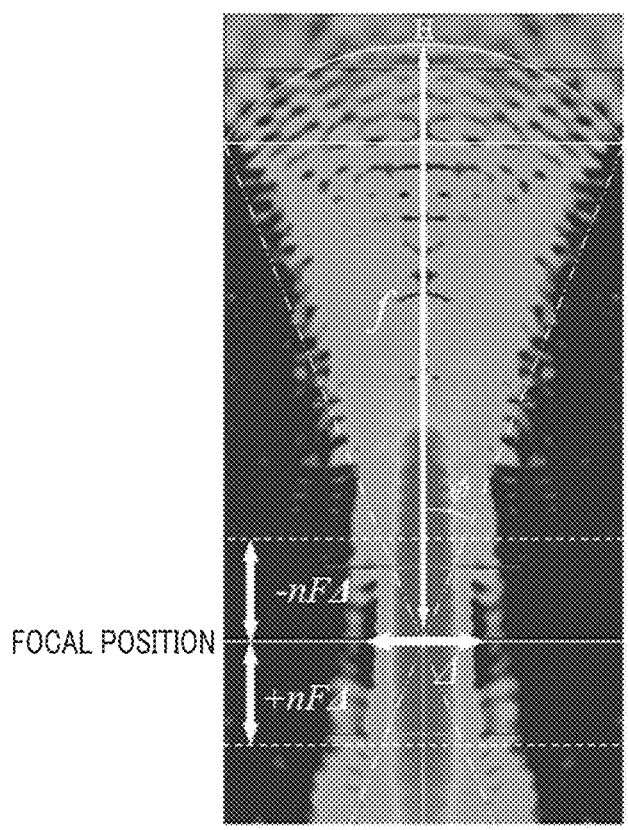
FIGS. 6A and 6B are diagrams illustrating a light intensity distribution in a pixel.
Figure 6B:
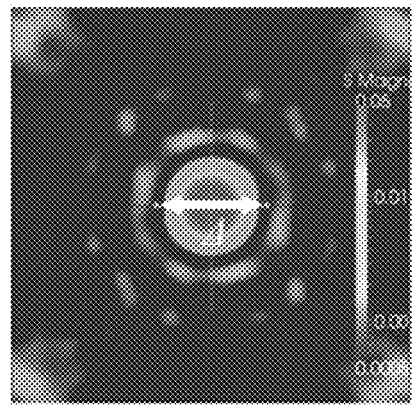

A state in which light is incident on the pixel 200G having the above-mentioned configuration will be described below in more detail. FIGS. 6A and 6B illustrate an example of a light intensity distribution when light is incident on the microlens 305 formed in the pixel 200G. FIG. 6A illustrates a light intensity distribution on a sectional surface parallel to an optical axis of the microlens, and FIG. 6B illustrates a light intensity distribution on a sectional surface perpendicular to the optical axis of the microlens at a focal position of the microlens. In FIGS. 6A and 6B, a surface H denotes a convex surface of the microlens 305, a focal distance f denotes a focal distance of the microlens, a movable range nfΔ denotes a movable range of the focal position due to refocusing which will be described later, and an angle φ denotes a maximum angle of an incident light flux.

Incident light is focused on the focal position by the microlens 305, but the diameter of a focusing spot is not smaller than a diffraction limit Δ due to an influence of diffraction based on the wave nature of light and is a finite size, for example, as illustrated in FIGS. 6A and 6B. For example, when the size of the light receiving surface of the photoelectric conversion portion 301 ranges from about 1 µm to 2 µm, the focusing spot of the microlens is about 1 µm. Accordingly, the pupil subarea 501 (the pupil subarea 502 in the photoelectric conversion portion 302) which is conjugate with the light receiving surface of the photoelectric conversion portion 301 with the microlens 305 interposed therebetween has a light reception proportion distribution (a pupil intensity distribution) in which pupil split is not clearly generated due to diffraction blurring.

Figure 7:
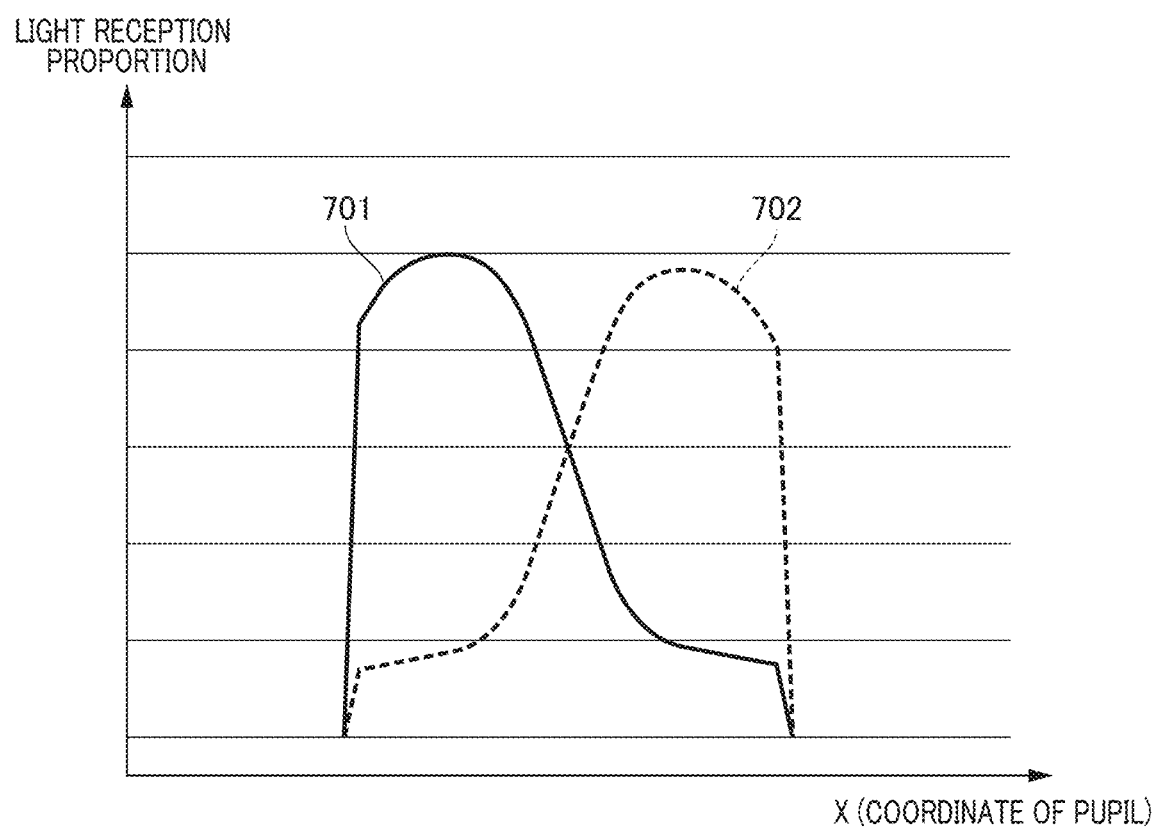
FIG. 7 is a diagram illustrating an example of a pupil intensity distribution.

The pupil intensity distribution in the pixel 200G is the same as schematically illustrated in FIG. 7 in which the horizontal axis represents the pupil coordinates and the vertical axis represents a light reception proportion. A pupil intensity distribution 701 denotes an example (a solid line) of the pupil intensity distribution in the pupil subarea 501 along the X axis in FIG. 5, and a pupil intensity distribution 702 denotes an example (a dotted line) of the pupil intensity distribution in the pupil subarea 502 along the X axis. The pupil subarea 501 and the pupil subarea 502 have smooth peaks of the pupil intensity at different pupil positions, and light passing through the microlens 305 is smoothly pupil-split.

Figure 8A:
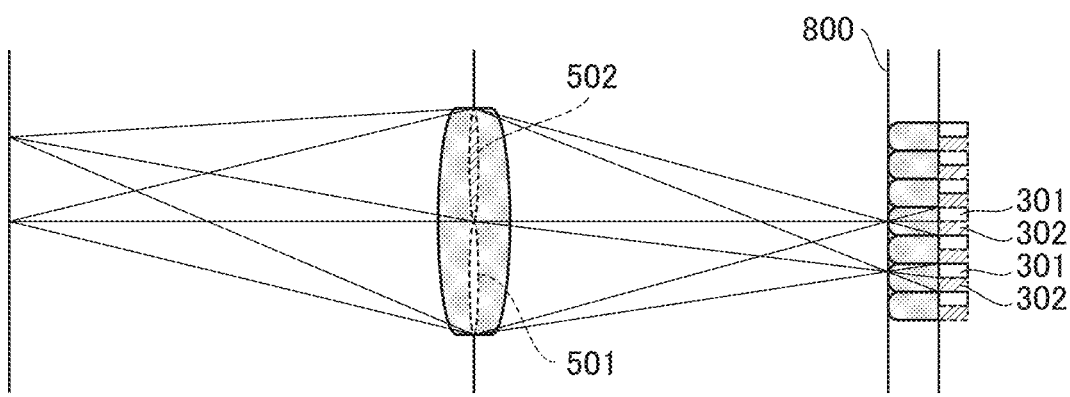
FIGS. 8A and 8B are diagrams illustrating a relationship between an imaging element and pupil split and a relationship between a defocus value and an image shift value.

The relationship between pixels located at different positions of the imaging element 107 and the pupil split is the same as illustrated in FIG. 8A, light fluxes passing through different pupil subareas (the pupil subarea 501 and the pupil subarea 502) are incident on the pixels of the imaging element 107 at different angles through an image-forming plane 800. Then, the light fluxes are received by the subpixel 201 (the photoelectric conversion portion 301) and the subpixel 202 (the photoelectric conversion portion 302) of each pixel which is partitioned in 2×1. That is, the imaging element 107 includes a plurality of pixels in which a plurality of subpixels configured to receive light fluxes passing through different pupil subareas of the image-forming optical system are provided.

By using the imaging element 107 having the above-mentioned configuration, light reception signals of the subpixels 201 of the pixels can be collected to generate a first viewpoint image, and light reception signals of the subpixels 202 of the pixels can be collected to generate a second viewpoint image. That is, a plurality of viewpoint images can be generated for the different pupil subareas from an input image acquired by each pixel of the imaging element 107. In this embodiment, since the first viewpoint image and the second viewpoint image are images in a Bayer array, the demosaicing process may be performed on the first viewpoint image and the second viewpoint image if necessary. It is possible to generate a captured image with a resolution of the number of effective pixels N by adding the signals of the subpixel 201 and the subpixel 202 and reading the resultant for each pixel of the imaging element.

In this embodiment, an example in which a captured image generated from a plurality of viewpoint images (the first viewpoint image and the second viewpoint image) is used is described. In FIG. 8A, an example in which a pupil area is split into two subareas in the horizontal direction is illustrated, but the pupil area may be split in the vertical direction depending on a subpixel splitting method. However, the invention is not limited thereto and any split method can be applied to this embodiment and another embodiment as long as it allows acquisition of a plurality of viewpoint images using a known technique. For example, as described in Japanese Patent Application Laid-Open No. 2011-22796, a configuration in which a plurality of cameras having different viewpoints are considered as the imaging element 107 may be employed. Unlike the optical system illustrated in FIG. 1, a configuration in which a light flux from an imaging optical system is re-focused on a microlens array such that an object plane and the imaging elements are conjugate with each other and the imaging element is provided on the image-forming plane may be employed. A configuration in which a light flux from an imaging optical system is re-focused on a microlens array (since a light flux which has been once focused and which is in a diffusing state is focused, it is referred to as re-focused) and an imaging element is provided on the image-forming plane may be employed. A method of inserting a mask with an appropriate pattern (a gain modulation element) into an optical path of an imaging optical system can also be used.

(Relationship Between Defocus Value and Image Shift Value Between Viewpoint Images)

Figure 8B:
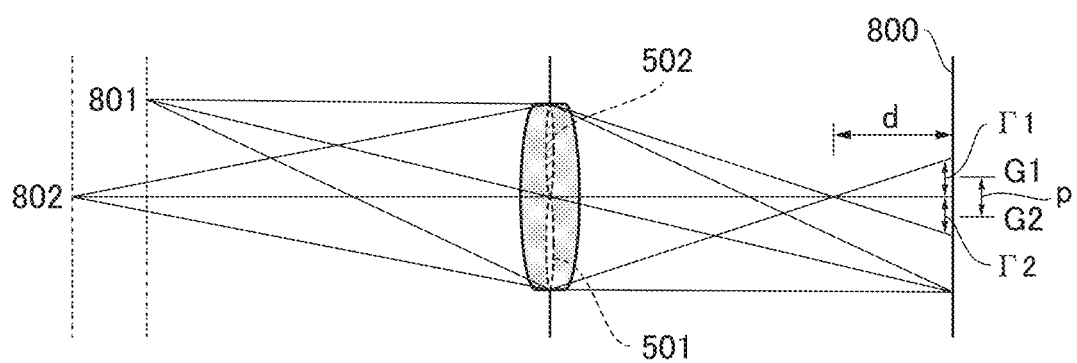

A relationship between a defocus value and an image shift value between the first viewpoint image and the second viewpoint image which are output from the imaging element 107 will be described below. FIG. 8B schematically illustrates a relationship between a defocus value between the first viewpoint image and the second viewpoint image and an image shift value between the first viewpoint image and the second viewpoint image. The imaging element 107 (not illustrated in FIG. 8B) is disposed on an image-forming plane 800, and an exit pupil of the image-forming optical system is split into the pupil subarea 501 and the pupil subarea 502 as illustrated in FIGS. 5, 8A, and 8B.

Figure 9:
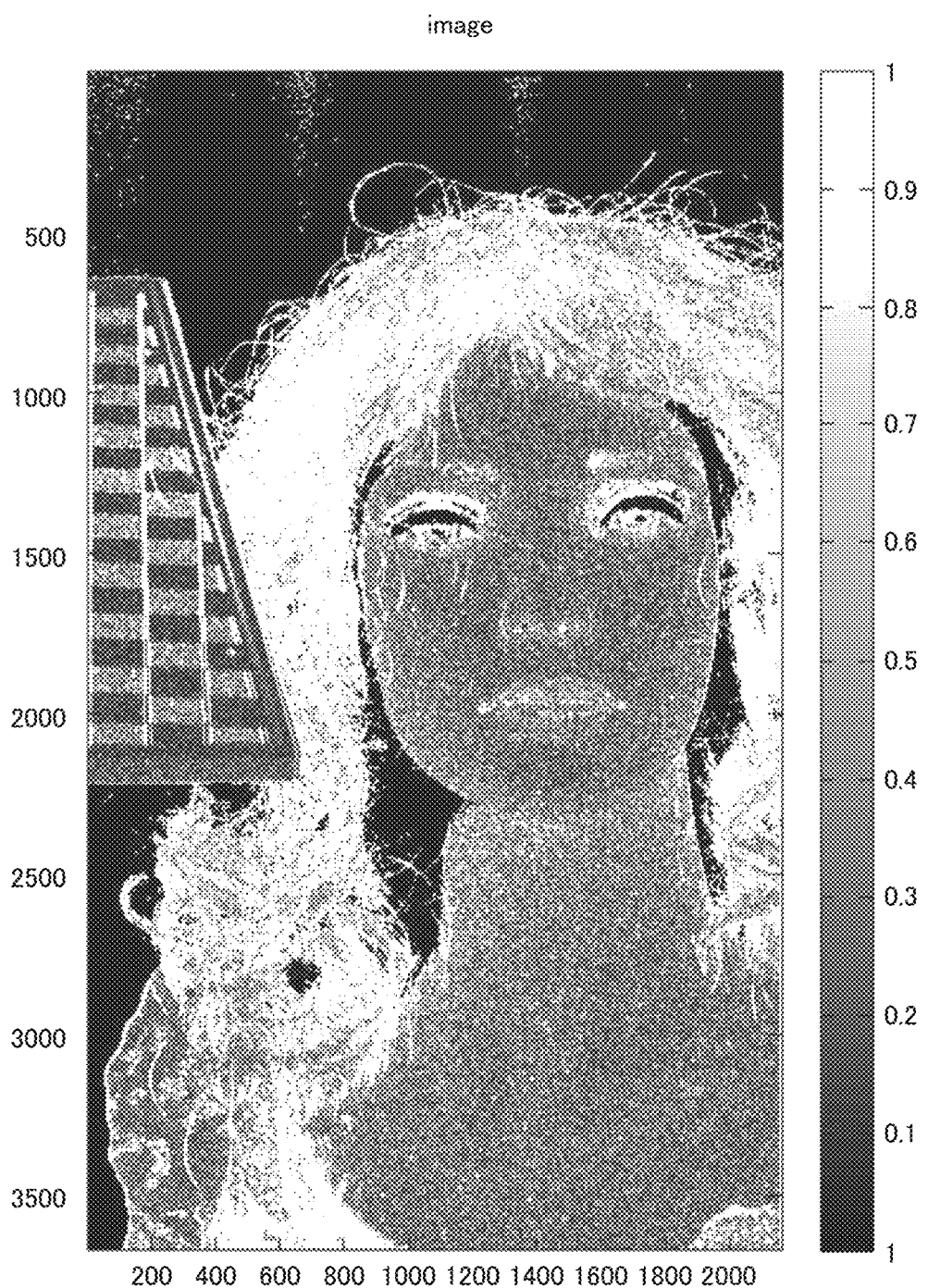
FIG. 9 is a diagram illustrating an example of a contrast distribution of a captured image.

Regarding a defocus value d, a distance from an image forming position of a subject to the image-forming plane 800 is expressed by a magnitude |d|. Regarding the defocus value d, for example, a state in which the image forming position of a subject is located on the subject side with respect to the image-forming plane 800 (also referred to as a front-focused state) is expressed by a minus sign (d<0). On the other hand, a state in which the image forming position of a subject is located on the side opposite to the subject side with respect to the image-forming plane 800 (also referred to as a rear-focused state) is expressed by a plus sign (d>0). In a focused state in which the image forming position of a subject is located on the image-forming plane, d=0 is satisfied. In FIG. 9, an example in which a subject 801 is in a focused state (d=0) and an example in which a subject 802 is in a front-focused state (d<0) are illustrated. The front-focused state (d<0) and the rear-focused state (d>0) are both referred to as a defocused state (|d|>0).

In the front-focused state (d<0), a light flux passing through the pupil subarea 501 (the pupil subarea 502) from the light flux from the subject 802 is once focused, then diffuses with a width Γ1 (Γ2) from the center of gravity G1 (G2) of the light flux, and becomes a blurred image on the image-forming plane 800. The blurred image is received by the subpixel 201 (the subpixel 202) constituting each pixel disposed in the imaging element, and a first viewpoint image (a second viewpoint image) is generated. Accordingly, the first viewpoint image (the second viewpoint image) is recorded as a subject image in which the subject 802 is blurred with the width Γ1 (Γ2) at the center of gravity G1 (G2) on the image-forming plane 800. The blurring width Γ1 (Γ2) of the subject image increases substantially in proportion to an increase of the magnitude |d| of the defocus value d. Similarly, a magnitude |p| of an image shift value p of the subject image (=a difference in the center of gravity of the light flux G1-G2) between the first viewpoint image and the second viewpoint image also increases substantially in proportion to an increase of the magnitude |d| of the defocus value d. In the rear-focused state (d>0), an image shift direction of the subject image between the first viewpoint image and the second viewpoint image is opposite to that in the front-focused state and the other is the same.

Accordingly, in this embodiment, the magnitude of the image shift value between the first viewpoint image and the second viewpoint image increases with the increase in the magnitude of the defocus value between the first viewpoint image and the second viewpoint image or of an imaging signal obtained by adding the first viewpoint image and the second viewpoint image.

(Viewpoint Image Correction and Refocusing)

A viewpoint image correcting process and a refocusing process which are viewpoint image processing according to this embodiment will be described below. In the refocusing process according to this embodiment, as a first step, the viewpoint change processing unit 155 calculates a contrast distribution indicating a height of a contrast based on pixel values of a captured image. As a second step, the viewpoint change processing unit 155 performs conversion of enhancing a difference between a plurality of viewpoint images (the first viewpoint image and the second viewpoint image) on the basis of the calculated contrast distribution to enhance a parallax for each pixel and generates a plurality of corrected viewpoint images (a first corrected viewpoint image and a second corrected viewpoint image). As a third step, the refocus processing unit 156 shifts and adds the plurality of corrected viewpoint images (the first corrected viewpoint image and the second corrected viewpoint image) relatively and generates a refocused image.

In the following description, i and j are assumed to be integers and a position of the j-th in the row direction and the i-th in the column direction in the imaging element 107 is defined as (j, i). A first viewpoint image of a pixel located at the position (j, i) is expressed as A0(j, i), a second viewpoint image is expressed as B0(j, i), and a captured image is expressed as I(j, i)=A0(j, i)+B0(j, i).

(First Step: Calculation of Contrast Distribution)

The viewpoint change processing unit 155 calculates a luminance Y(j, i) with the color centers of gravity of RGB matching for each position (j, i) using Equation (1) for the captured image I(j, i) in a Bayer array.

$$Y(j, i) = [0.25^*I(j-1, i-1) + 0.5^*I(j-1, i) + 0.25^*I(j-1, i+1) + \quad (1)$$
$$0.5^*I(j, i-1) + 1.0^*I(j, i) + 0.5^*I(j, i+1) +$$
$$0.25^*I(j+1, i-1) + 0.5^*I(j+1, i) + 0.25^*I(j+1, i+1)]/4$$

The viewpoint change processing unit 155 applies a Laplacian filtering process such as [1, 2, −1, −4, −1, 2, 1] on the luminance Y(j, i) in the horizontal direction (the column i direction) which is a pupil split direction and calculates a high-frequency component dY(j, i) in the horizontal direction. The viewpoint change processing unit 155 may apply a high-frequency cut filtering process such as [1, 1, 1, 1, 1, 1] in the vertical direction (the row j direction), not in the pupil split direction, if necessary and curb high-frequency noise in the vertical direction.

The viewpoint change processing unit 155 calculates a standardized (normalized) high-frequency component dZ(j, i) in the horizontal direction using Equation (2). Here, addition of an integer Y0 to the denominator is performed to prevent divergence of Equation (2) due to division by zero. The viewpoint change processing unit 155 may apply the high-frequency cut filtering process on the luminance Y(j, i) to curb high-frequency noise before the standardization of Equation (2) is performed.

$$dZ(j,i)=dY(j,i)/(Y(j,i)+Y_0) \quad (2)$$

The viewpoint change processing unit 155 calculates a contrast distribution C(j, i) using Equation (3). The first row in Equation (3) represents that the contrast distribution C(j, i) is set to 0 when the luminance of a captured image is lower than a predetermined luminance Yc. On the other hand, the third row in Equation (3) represents that the contrast distribution C(j, i) is set to 1 when the standardized high-frequency component dZ(j, i) is greater than a predetermined value Zc. The other row (that is, the second row in Equation (3)) represents that a value obtained by standardizing dZ(j, i) using Zc is the contrast distribution C(j, i).

$$C(j, i) = \begin{cases} 0 & (Y(j, i) < Y_c) \\ dZ(j, i)/Z_c & (dZ(j, i) \leq Z_c) \\ 1 & (dZ(j, i) > Z_c) \end{cases} \quad (3)$$

Here, the contrast distribution C(j, i) has a value in a range of [0, 1], the contrast becomes lower as it gets closer to 0, and the contrast becomes higher as it gets closer to 1.

FIG. 9 illustrates an example of the contrast distribution C(j, i) of a captured image which is acquired using Equation (3). In the contrast distribution, a white part represents that the high-frequency component in the horizontal direction is great and the contrast is high, and a black part represents that the high-frequency component in the horizontal direction is small and the contrast is low.

(Second Step: Parallax Enhancing Process Between Viewpoint Images)

A parallax enhancing process between viewpoint images will be described below. In the parallax enhancing process, first, an image shift distribution of the viewpoint images is calculated. The image shift distribution is acquired by performing a correlation operation on a pair of images including the first viewpoint image A0 and the second viewpoint image B0 and calculating a relative position shift value of the pair of images. Various methods are known as the correlation operation, and the viewpoint change processing unit 155 can obtain a correlation value between the images, for example, by adding the absolute value of the difference between the pair of images as expressed by Equation (4).

$$k \geq 0 \;\; COR(k) = \sum_{i}^{ni} |A0_{i+k} - B0_i| \quad (4)$$
$$k < 0 \;\; COR(k) = \sum_{i}^{ni} |A0_i - B0_{i+k}|$$

Here, A0i and B0i denote luminances of the i-th pixels of the first viewpoint image A0 and the second viewpoint image B0. Here, "ni" is a numeral denoting the number of pixels which are used for the arithmetic operation and is appropriately set depending on a minimum arithmetic operation range of the image shift distribution.

The viewpoint change processing unit 155 calculates, for example, k at which COR(k) in Equation (4) is minimized as the image shift value. That is, in a state in which a pair of images are shifted by k pixels, the absolute value of the difference between the i-th A0 pixel and the i-th B0 pixel in the row direction is acquired and the absolute value is added to the plurality of pixels in the row direction. Then, the viewpoint change processing unit 155 considers the added value, that is, k at which COR(k) is minimized, as the image shift value between A0 and B0 and calculates a shift value k pixels.

On the other hand, when a two-dimensional image is shifted by k pixels in only the pupil split direction and the difference between the first viewpoint image A0 and the second viewpoint image B0 is acquired and is added to a plurality of columns, the correlation operation is defined by Equation (5).

$$k \geq 0 \;\; COR(k) = \sum_{j}^{nj} \sum_{i}^{ni} |A0_{(i+k)j} - B0_i| \quad (5)$$
$$k < 0 \;\; COR(k) = \sum_{j}^{nj} \sum_{i}^{ni} |A0_{ij} - B0_{(i+k)j}|$$

Here, A0ij and B0ij denote luminances of the j-th and i-th pixels in the first viewpoint image A0 and the second viewpoint image B0. Here, "ni" denotes the number of pixels which are used for the arithmetic operation and "nj" denotes the number of image pairs in the column directions on which the correlation operation is performed.

The viewpoint change processing unit 155 calculates k at which COR(k) in Equation (5) is minimized as the image shift value similarly to Equation (4). Subscript k is added to only i and is regardless of j. This means that the correlation operation is performed while a two-dimensional image is being shifted in only the pupil split direction. The viewpoint change processing unit 155 can calculate the image shift value of each area in the first viewpoint image A0 and the second viewpoint image B0 using Equation (5) and can calculate an image shift distribution.

In the refocusing process according to this embodiment which will be described later, the refocusing process is performed by performing sharpness processing which will be described later on only a high-contrast part. Accordingly, in the process of calculating the contrast distribution, the correlation operation based on Equation (5) may not be performed on an area in which the contrast distribution C(j, i) is 0 (that is, a position with a luminance lower than a predetermined luminance Yc).

A specific example of the parallax enhancing process will be described below. As the example of the pupil intensity distribution illustrated in FIG. 7, the pupil split using the microlens formed for each pixel and a plurality of divided photoelectric conversion portions is smoothly performed due to diffraction blurring. Accordingly, in a plurality of viewpoint images based on the intensity distribution of the smoothly split pupil, since an effective F value in the pupil split direction is not sufficiently dark (great), an effective focal depth is not great.

Accordingly, in this embodiment, the viewpoint change processing unit 155 performs a process of enlarging a difference between the viewpoint images and enhancing a parallax for each pixel on a plurality of viewpoint images (the first viewpoint image and the second viewpoint image). The viewpoint change processing unit 155 generates a plurality of corrected viewpoint images (a first corrected viewpoint image and a second corrected viewpoint image) through the parallax enhancing process.

The viewpoint change processing unit 155 enlarges the difference between the viewpoint images by applying Equations (6) and (7) to the first viewpoint image A0(j, i) and the second viewpoint image B0(j, i), and generates the first corrected viewpoint image A(j, i) and the second corrected viewpoint image B(j, i). Here, k (0≤k≤1) and a (0≤α≤1) are real numbers.

$$A_1(j, i) = k_1 * A_0(j, i) + k_2 * B_0(j, i), \quad (6)$$
$$B_1(j, i) = k_2 * A_0(j, i) + k_1 * B_0(j, i),$$
$$k_1 = \frac{1-k}{1-2k}, k_2 = -\frac{k}{1-2k}$$

-continued $$A(j, i) = \frac{|A_1(j, i)| + A_1(j, i)}{2} + \alpha * \frac{|B_1(j, i)| - B_1(j, i)}{2},$$  (7)

$$B(j, i) = \frac{|B_1(j, i)| + B_1(j, i)}{2} + \alpha * \frac{|a_1(j, i)| - A_1(j, i)}{2}$$

Figure 10:
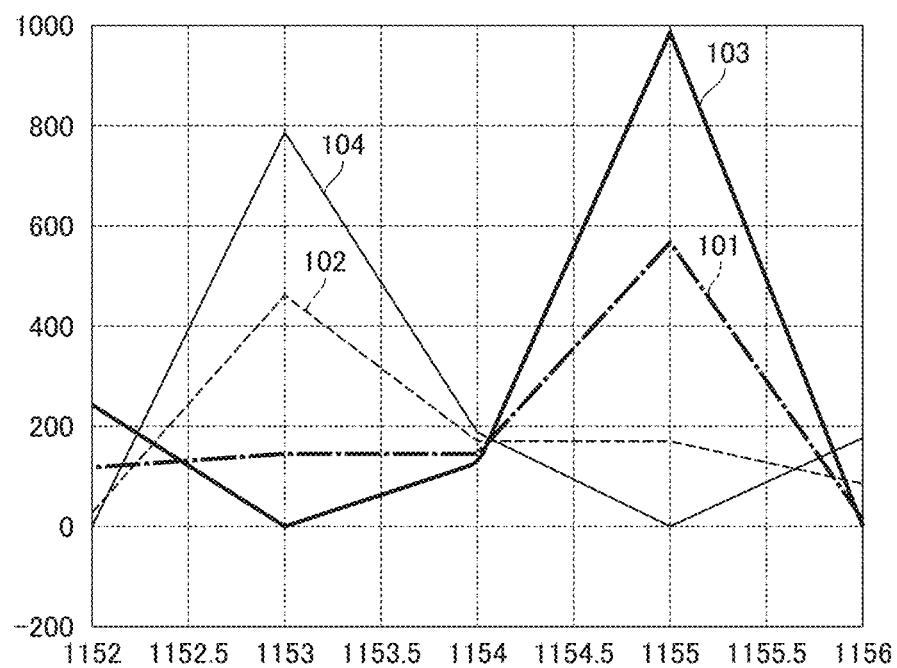
FIG. 10 is a diagram illustrating an example of parallax enhancement of enhancing a difference between viewpoint images.

FIG. 10 illustrates an example in which the difference between the viewpoint images at a predetermined position is enlarged by the parallax enhancing process. Examples of the first viewpoint image A0 (101) and the second viewpoint image B0 (102) before the parallax enhancing process is performed are denoted by dotted lines, and examples of the first corrected viewpoint image A (103) and the second corrected viewpoint image B (104) after the parallax enhancing process using Equations (4) and (5) is performed are indicated by solid lines. In FIG. 10, the horizontal axis represents $1152^{nd}$ to $1156^{th}$ pixels in the units of subpixels, and the vertical axis represents the magnitude of the parallax in each pixel. By the parallax enhancing process, a part with a small difference between the viewpoint images does not vary much, but a part with a large difference between the viewpoint images is enlarged (for example, near the $1153^{rd}$ or $1155^{th}$ pixel) and the parallax thereof is enhanced.

In this way, in this embodiment, the viewpoint change processing unit 155 generates a plurality of corrected viewpoint images of which the parallax is enhanced by enlarging the difference between a plurality of viewpoint images for each of the plurality of viewpoint images. The viewpoint change processing unit 155 can curb a load of the parallax enhancing process by performing the arithmetic operation using the signals of a plurality of subpixels included in each pixel as in Equations (6) and (7).

In Equation (6), when the value of k increases to strongly enhance a parallax, the parallax between a plurality of corrected viewpoint images (the first corrected viewpoint image and the second corrected viewpoint image) is enhanced. Accordingly, by increasing the value of k, the effective F value in the split direction can become darker (greater) and the effective focal depth in the split direction can be corrected to be deeper. However, when the parallax is excessively enhanced, noise of the corrected viewpoint images increases and an S/N ratio decreases.

Accordingly, in this embodiment, the conversion strength of parallax enhancement is area-adaptively adjusted on the basis of the contrast distribution C(j, i). For example, as for an area with a high contrast, the viewpoint change processing unit 155 increases the strength of parallax enhancement by enhancing the parallax and causes the effective F value in the split direction to be darker (greater). On the other hand, in an area with a low contrast, the viewpoint change processing unit 155 decreases the strength of parallax enhancement to maintain the S/N ratio and curbs a decrease in the S/N ratio. Accordingly, it is possible to enhance the parallax between a plurality of corrected viewpoint images (the first corrected viewpoint image and the second corrected viewpoint image), to cause the effective F value in the split direction to be darker (greater), and to correct the effective focal depth in the split direction to be deeper. In the refocusing process which will be described later, it is possible to improve a refocusing effect (emphasize image change due to refocusing) by generating a refocused image using a plurality of corrected viewpoint images (the first corrected viewpoint image and the second corrected viewpoint image).

The viewpoint change processing unit 155 can curb, for example, a decrease in the S/N ratio by setting the strength of parallax enhancement to be greater in an area with a high luminance than in an area with a low luminance in a captured image if necessary. Similarly, the viewpoint change processing unit 155 can also curb, for example, a decrease in the S/N ratio by setting the strength of parallax enhancement to be greater in an area with more high-frequency components than in an area with less high-frequency components in a captured image if necessary.

(Third Step: Refocusing Process)

Figure 11:
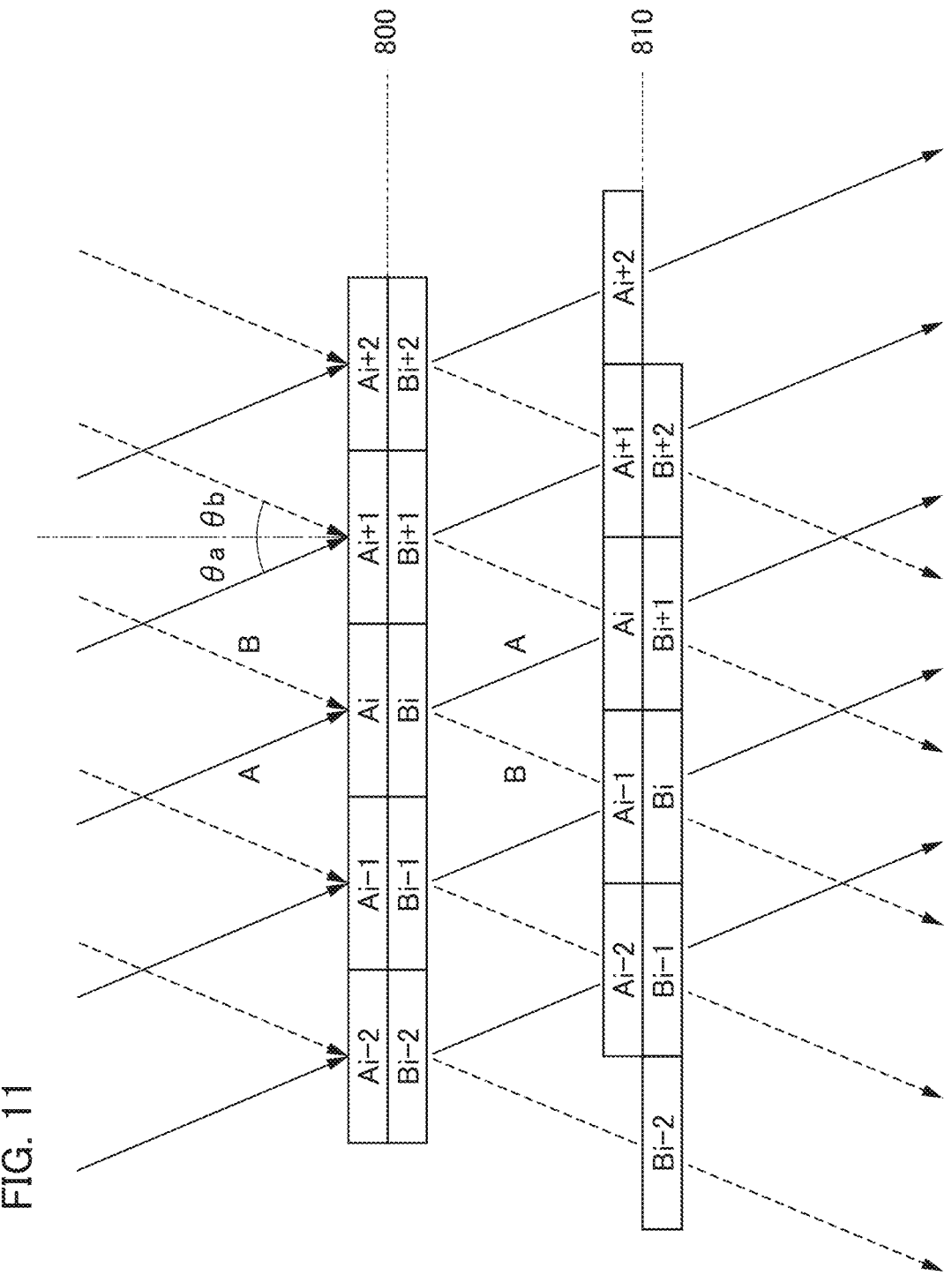
FIG. 11 is a diagram schematically illustrating a refocusing process.

The refocusing process in the pupil split direction (the column direction or the horizontal direction) using a plurality of corrected viewpoint images (a first corrected viewpoint image and a second corrected viewpoint image) will be described below with reference to FIG. 11. FIG. 11 schematically illustrates a first corrected viewpoint image Ai and a second corrected viewpoint image Bi including a signal of the i-th pixel in the column direction of the imaging element 107 disposed on the image-forming plane 800. The first corrected viewpoint image Ai includes a light reception signal of a light flux incident on the i-th pixel at a principal ray angle θa (corresponding to the pupil subarea 501 in FIG. 8A). The second corrected viewpoint image Bi includes a light reception signal of a light flux incident on the i-th pixel at a principal ray angle 9b (corresponding to the pupil subarea 502 in FIG. 8A). That is, the first corrected viewpoint image Ai and the second corrected viewpoint image Bi include incident angle information in addition to the light intensity distribution information.

Since the incident angle information is included, the refocus processing unit 156 can generate a refocused image on a predetermined virtual image-forming plane. Specifically, the refocus processing unit 156 translates the first corrected viewpoint image Ai to a virtual image-forming plane 810 along the angle 9a and translates the second corrected viewpoint image Bi to the virtual image-forming plane 810 along the angle θb. By adding the translated corrected viewpoint images for each pixel, it is possible to generate a refocused image on the virtual image-forming plane 810. In the example illustrated in FIG. 11, the translation of the first corrected viewpoint image Ai to the virtual image-forming plane 810 along the angle θa corresponds to shifting of the first corrected viewpoint image Ai by +0.5 pixel in the column direction. On the other hand, the translation of the second corrected viewpoint image Bi to the virtual image-forming plane 810 along the angle θb corresponds to shifting of the second corrected viewpoint image Bi by 4.5 pixel in the column direction. That is, the combination of the first corrected viewpoint image Ai and the second corrected viewpoint image Bi on the virtual image-forming plane 810 in the example illustrated in FIG. 11 is acquired by relatively shifting the first corrected viewpoint image Ai and the second corrected viewpoint image Bi by +1 pixel. Accordingly, it is possible to generate a refocused image on the virtual image-forming plane 810 by adding the first corrected viewpoint image Ai and the shifted second corrected viewpoint image Bi+1 for each pixel.

In this way, the refocus processing unit 156 generates a refocused image I(j, I; s) on the virtual image-forming plane based on an integer shift value by shifting and adding the first corrected viewpoint image A and the second corrected viewpoint image B using Equation (8) using the integer shift value s.

$$I(j,I;s)=A(j,i)+B(j,i+s)$$  (8)

In this embodiment, since the first corrected viewpoint image A and the second corrected viewpoint image B are formed in a Bayer array, the refocus processing unit 156 performs shifting and addition based on Equation (8) for each color using a shift value s=2n (where n is an integer) which is a multiple of 2. That is, the refocus processing unit 156 generates a refocused image I(j, I; s) with the Bayer array of the image kept and then perform a demosaicing process on the generated refocused image I(j, I; s). If necessary, the refocus processing unit 156 may first perform the demosaicing process on the first corrected viewpoint image A and the second corrected viewpoint image B and then perform the shifting and addition process using the first corrected viewpoint image and the second corrected viewpoint image subjected to the demosaicing process. If necessary, the refocus processing unit 156 may generate an interpolation signal between the pixels of the first corrected viewpoint image A and the second corrected viewpoint image B and generate a refocused image based on a non-integer shift value. Accordingly, it is possible to generate a refocused image in which a position on the virtual image-forming plane has changed with a higher resolution.

Sharpness processing and calculation of a re-focusable range which are applied for the refocus processing unit 156 to generate a more effective refocused image will be described below.

(Sharpness Processing)

As described above, in the refocusing process, in the refocusing process, the first corrected viewpoint image A and the second corrected viewpoint image B are shifted and added to generate a refocused image on the virtual image-forming plane. Since the first corrected viewpoint image A and the second corrected viewpoint image B are shifted by the shifting and addition, a relative shift value (also referred to as an image shift value) with respect to the image not subjected to the refocusing process. Here, the integer shift value s in the refocusing process corresponds to the image shift value. Accordingly, the refocus processing unit 156 can realize edge reinforcement of a subject in the refocused image by performing sharpness processing on the area corresponding to the image shift value s.

Figure 12:
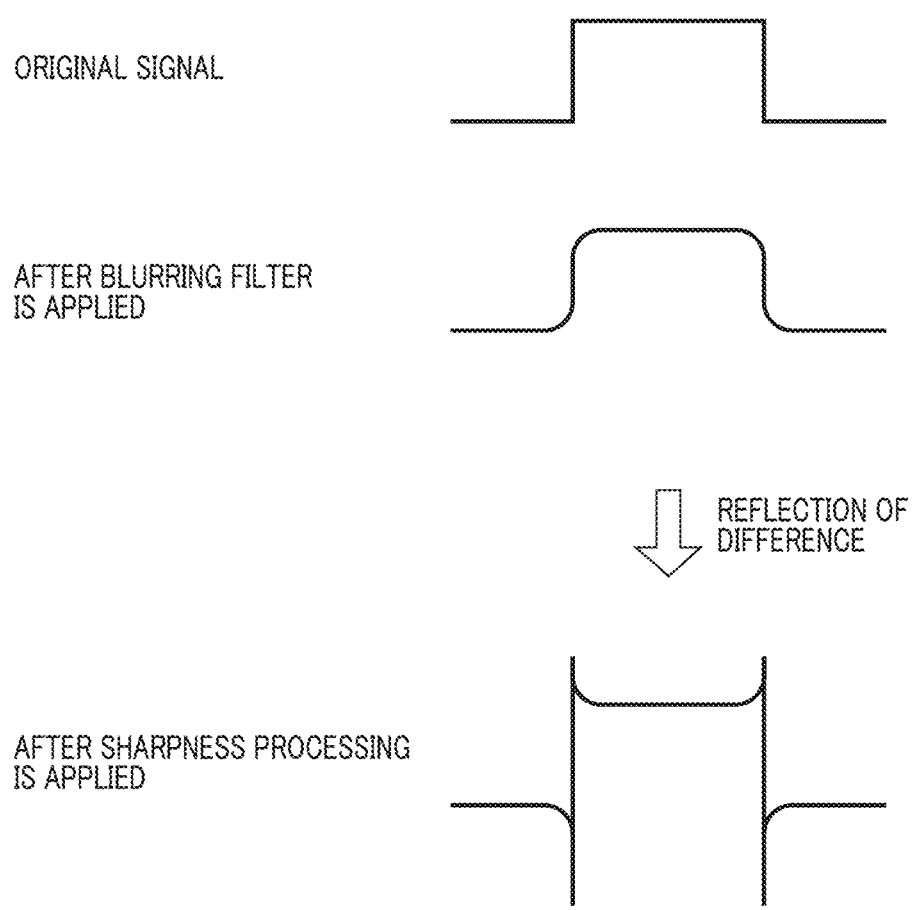
FIG. 12 is a diagram schematically illustrating an unsharpening process.

For example, unsharpening mask processing of which the summary is illustrated in FIG. 12 is used in the sharpness processing according to this embodiment. The unsharpening mask processing realizes edge reinforcement by applying a blurring filter to a local area (an original signal) centered on a pixel of interest and reflecting a difference in pixel value between before and after application of the blurring process in the pixel value of the pixel of interest. The unsharpening mask processing on a pixel value P to be processed is performed using Equation (9). Here, P' denotes a pixel value after the processing has been performed, R denotes a radius of the blurring filter, and T denotes an application intensity (%).

$$P'(i,j)=P(i,j)+(P(i,j)-F(i,j,R))\times T(i,j)/100 \quad (9)$$

In Equation (9), F(i, j, R) is a pixel value which is acquired by applying a blurring filter with a radius R to the pixel P(I, j). A known method, for example, Gaussian blurring, can be used for the blurring filter. The Gaussian blurring is an averaging process using a weight based on a Gaussian distribution depending on a distance from a pixel to be processed, and a natural processing result can be accordingly obtained. The radius R of the blurring filter relates to a wavelength or a frequency on an image to which the sharpness processing is applied. That is, a sharp shape is emphasized as R becomes smaller and a gradual shape is emphasized as R becomes larger. The application intensity T(I, j) is a value by which an application intensity of edge reinforcement by the unsharpening mask processing varies depending on the image shift distribution. Specifically, when the image shift value of a position of each pixel is defined as pred(i, j) and a shift value by the refocusing process is defined as s, the application intensity T increases for an area in which |s-pred(i, j)| has a small value (for example, the image shift value is less than one pixel), that is, an area in which a focused state is set on the virtual image-forming plane. On the other hand, the application intensity T increases for an area in which |s-pred(i, j)| has a large value (for example, the shift value is equal to or greater than three pixels). Accordingly, it is possible to reinforce an edge at a focal position at which the defocus value is small or in an area close to the focal point and to prohibit the unsharpening mask processing from being performed in a blurred area in which the defocus value is large (or to perform a blurring process). That is, it is possible to further enhance an effect of shift of a focal position by the refocusing process.

(Calculation of Re-Focusable Range)

Figure 13:
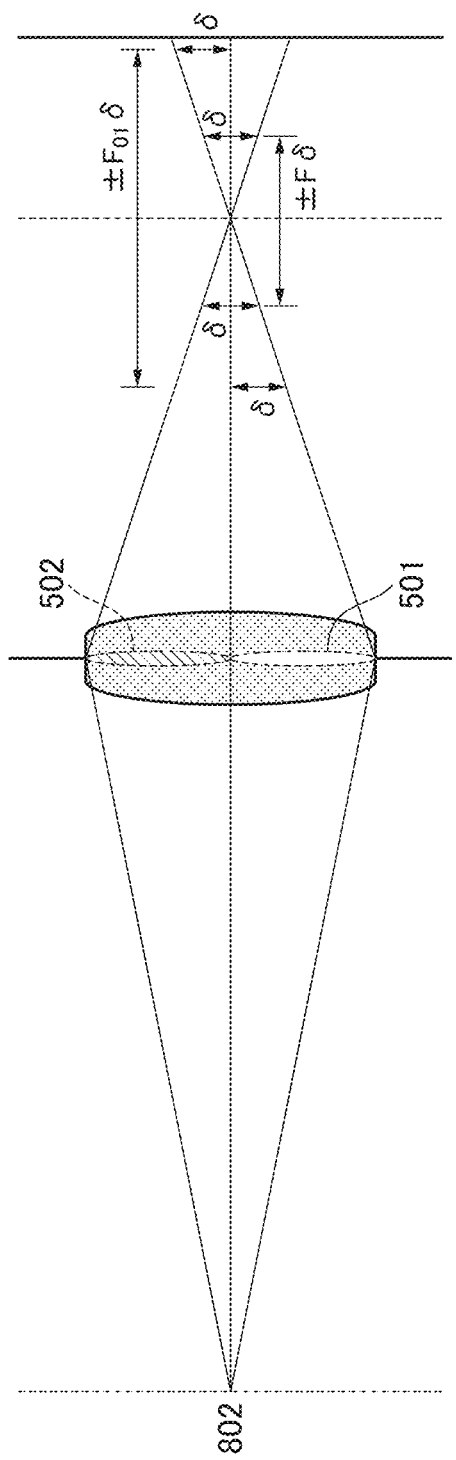
FIG. 13 is a diagram illustrating a re-focusable range.

A re-focusable range represents a range of a focal position which can be shifted by the refocusing process. For example, FIG. 13 schematically illustrates the re-focusable range according to this embodiment. When a permissible circle of confusion is defined as δ and an aperture value of the image-forming optical system is defined as F, the depth of field at the aperture value F is ±Fδ. On the other hand, an effective aperture value F01 (F02) in the horizontal direction of the pupil subarea 501 (502) narrowed by NH×NV (2×1) split is F01=NHF and it gets darker. The effective depth of field for each first corrected viewpoint image (each second corrected viewpoint image) is ±NHFδ and is deepened to NH times, and the focusing range is widened to NH times. That is, within the range of the effective depth of field ±NHFδ, a focused subject image is acquired for each first corrected viewpoint image (each second corrected viewpoint image). Accordingly, the refocus processing unit 156 can readjust (refocus) the focal position after capturing an image through the refocusing process of translating the first corrected viewpoint image (the second corrected viewpoint image) along the principal ray angle θa (θb) illustrated in FIG. 11. In other words, the defocus value d from the image-forming plane by which the focal position can be readjusted (refocused) after capturing an image is limited and the re-focusable range of the defocus value d is substantially the range expressed by Equation (10).

The permissible circle of confusion δ is defined, for example, as δ=2ΔX (a reciprocal of the nyquist frequency 1/(2ΔX) of a pixel period ΔX)). By calculating the re-focusable range in this way, it is possible to cope with an operable range when the focal position is changed (refocused) by a user's operation. Since a ray (a subject) which can be focused through the refocusing process can be understood in advance, for example, imaging conditions such as a state of the image-forming optical system can also be controlled such that a predetermined subject is included in the re-focusable range, and an image can also be captured again.

(Viewpoint Moving Process)

A viewpoint moving process according to this embodiment which is performed by the viewpoint change processing unit 155 will be described below. The viewpoint moving process is a process for reducing blurring due to a non-main subject when blurring of a near-side non-main subject covers a main subject.

Figure 14A:
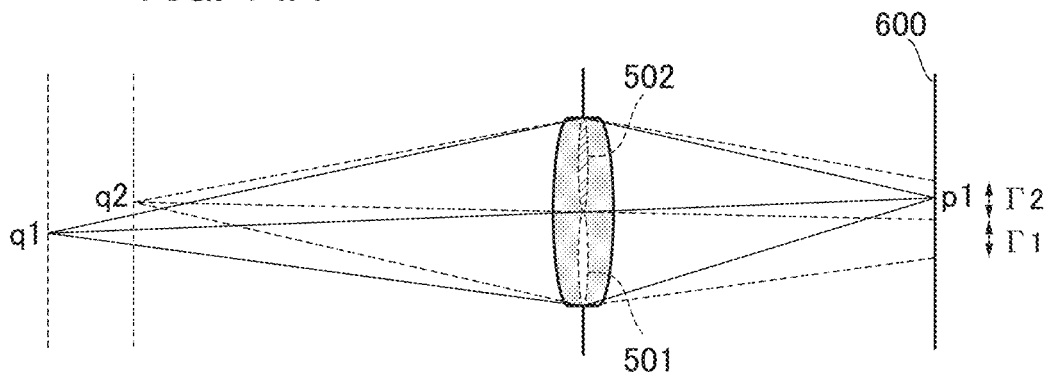
FIGS. 14A to 14C are diagrams illustrating the principle of a viewpoint moving process.
Figure 14B:
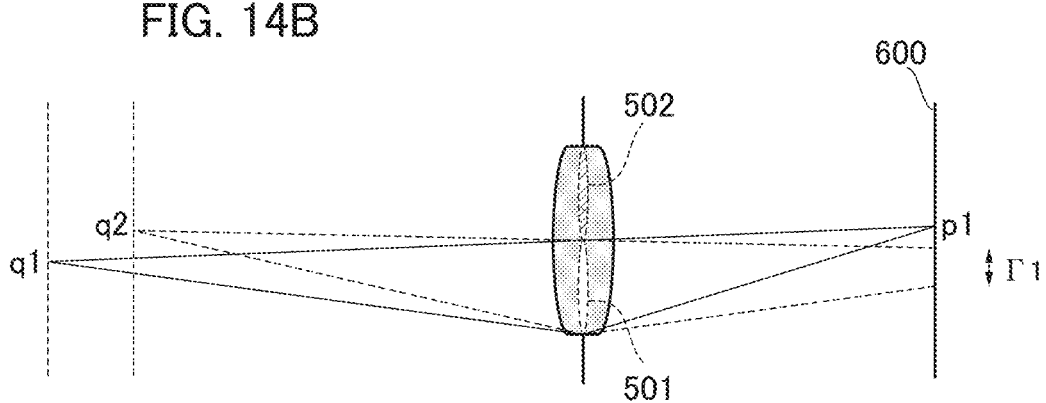
Figure 14C:
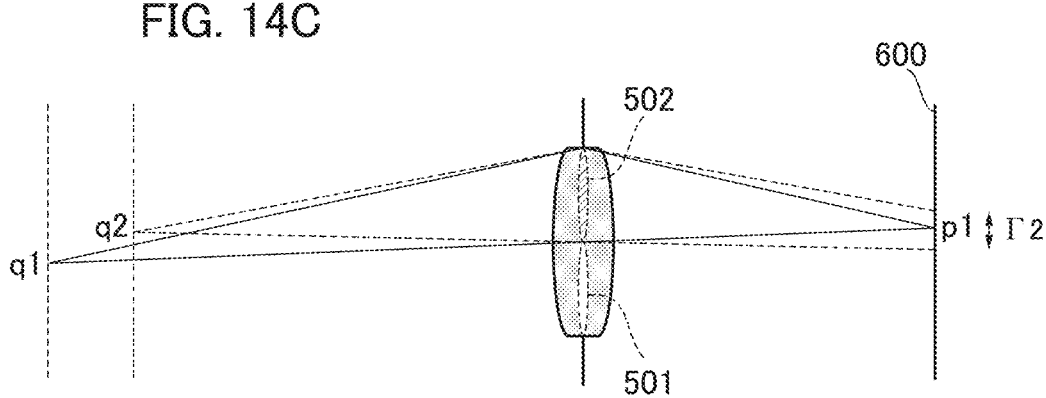

FIGS. 14A to 14C illustrate the principle of the viewpoint moving process. In this embodiment, an imaging element 107 (not illustrated) is disposed on an image-forming plane 600, and an exit pupil of an image-forming optical system is split into a pupil subarea 501 and a pupil subarea 502 similarly to FIG. 11. FIG. 14A illustrates an example in which an image is captured such that a blurred image Γ1+Γ2 of a near-side subject q2 overlaps a focused image p1 of a main subject q1 (also referred to as covering of the main subject with the near-side blurring). FIGS. 14B and 14C illustrate examples in which the example illustrated in FIG. 14A is split into a light flux passing through the pupil subarea 501 of the image-forming optical system and a light flux passing through the pupil subarea 502. In FIG. 14B, the light flux from the main subject q1 passes through the pupil subarea 501 and focuses on the image p1 in a focused state.

On the other hand, the light flux from the near-side subject q2 passes through the pupil subarea 501 and spreads on the blurred image Γ1 in a defocused state. The light fluxes are received by the subpixels 201 of different pixels of the imaging element 107 to generate a first viewpoint image. As illustrated in FIG. 14B, in the first viewpoint image, the image p1 of the main subject q1 and the blurred image Γ1 of the near-side subject q2 are received without overlapping. This means a viewpoint image obtained by imaging the subject on the closest side (the blurred image Γ1 of the subject q2) in the narrowest range from a plurality of viewpoint images (the first viewpoint image and the second viewpoint image) in a predetermined area (in the vicinity of the image p1 of the subject q1). In other words, a viewpoint image in which reflection of the blurred image Γ1 of the subject q2 is small and an evaluated contrast value is the largest from a plurality of viewpoint images (the first viewpoint image and the second viewpoint image) is obtained in a predetermined area (in the vicinity of the image p1 of the subject q1).

On the other hand, in FIG. 14C, the light flux from the main subject q1 passes through the pupil subarea 502 and focuses on the image p1 in a focused state. On the other hand, the light flux from the near-side subject q2 passes through the pupil subarea 502 and spreads on the blurred image Γ2 in a defocused state. The light fluxes are received by the subpixels 202 of different pixels of the imaging element 107 to generate a second viewpoint image. As illustrated in FIG. 14C, in the second viewpoint image, the image p1 of the main subject q1 and the blurred image Γ2 of the near-side subject q2 are received in an overlapping state. This means a viewpoint image obtained by imaging the subject on the closest side (the blurred image Γ2 of the subject q2) in the widest range from a plurality of viewpoint images (the first viewpoint image and the second viewpoint image) in a predetermined area (in the vicinity of the image p1 of the subject q1). In other words, a viewpoint image in which reflection of the blurred image Γ2 of the subject q2 is large and an evaluated contrast value is the smallest from a plurality of viewpoint images (the first viewpoint image and the second viewpoint image) is obtained in a predetermined area (in the vicinity of the image p1 of the subject q1). Accordingly, in the vicinity of the image p1, when a weighting factor of the first viewpoint image in which the image p1 and the blurred image Γ1 overlap less is set to be great, a weighting factor of the second viewpoint image in which the image p1 and the blurred image Γ2 overlap greater is set to be small, and both viewpoint images are added, it is possible to reduce covering of the main subject with the near-side blurring.

A process of overlapping the first viewpoint image and the second viewpoint image using weighting factors, which is performed by the viewpoint change processing unit 155, will be described below. The viewpoint change processing unit 155 receives the first viewpoint image A(j, i) and the second viewpoint image B(j, i). As a first step, the viewpoint change processing unit 155 sets a predetermined area R=[$j_1$, $j_2$]×[$i_1$, $i_2$] in which viewpoint movement is performed and a boundary width σ of the predetermined area, and calculates a table function T(j, i) based on the predetermined area R and the boundary width σ of the predetermined area using Equation (11).

$$T(j, i) = 0.5 * \left[\tanh\frac{(j - j_1)}{\sigma} - \tanh\frac{(j - j_2)}{\sigma}\right] \times \\ 0.5 * \left[\tanh\frac{(i - i_1)}{\sigma} - \tanh\frac{(i - i_2)}{\sigma}\right] \quad (11)$$

The table function T(j, i) is a function which has 1 inside the predetermined area R and 0 outside the predetermined area R, and varies substantially continuously from 1 to 0 in the boundary width σ of the predetermined area R. If necessary, the viewpoint change processing unit 155 may set the predetermined area to a circular shape or other arbitrary shape or may set a plurality of predetermined areas and a plurality of boundary widths.

As a second step, the viewpoint change processing unit 155 calculates a first weighting factor $W_a$(j, i) of the first viewpoint image A(j, i) based on Equation (12A) using areal coefficient w (−1≤w≤1). The viewpoint change processing unit 155 also calculates a second weighting factor $W_b$(j, i) of the second viewpoint image B(j, i) based on Equation (12B).

$$W_a(j,i)=1-wT(j,i), \quad (12A)$$

$$W_b(j,i)=1+wT(j,i) \quad (12B)$$

As a third step, the viewpoint change processing unit 155 generates an output image I(j, i) based on Equation (13) using the first viewpoint image A(j, i), the second viewpoint image B(j, i), the first weighting factor $W_a$(j, i), and the second weighting factor $W_b$(j, i).

$$I(j,i)=W_a(j,i)*A(j,i)+W_b(j,i)*B(j,i). \quad (13)$$

Alternatively, the viewpoint change processing unit 155 may generate an output image $I_s$(j, i) based on Equation (14A) or Equation (14B) in combination with the refocusing process using the shift value s.

$$I_s(j,i)=W_a(j,i)*A(j,i)+W_b(j,i)*B(j,i+s), \quad (14A)$$

$$I_s(j,i)=W_a(j,i)*A(j,i)+W_b(j,i+s)*B(j,i+s) \quad (14B)$$

The output image Is(j, i) which is output in this way is an image of which the viewpoint has been moved and is an image of which the focal position has been readjusted (refocused).

In this way, the weighting factor varying continuously along the area of the output image is used and a plurality of viewpoint images are weighted and combined to generate an output image. When it is intended to reduce covering of the main subject with the near-side blurring in Equation (13), the viewpoint change processing unit 155 sets the first weighting factor $W_a$ of the first viewpoint image A(j, i) in which the image p1 and the blurred image Γ1 overlap less to be greater than the second weighting factor $W_b$ of the second viewpoint image B(j, i) in which the image p1 and the blurred image Γ2 overlap greater in the vicinity of the image p1. Then, the output image is generated.

In other words, in a predetermined area of an image, the viewpoint change processing unit 155 sets the weighting factor of the viewpoint image obtained by imaging the near-side subject in the widest range to be the smallest or sets the weighting factor of the viewpoint image obtained by imaging the near-side subject in the narrowest range to be the largest. In a predetermined area of an output image, the viewpoint change processing unit 155 sets the weighting factor of the viewpoint image with the smallest evaluated contrast value to be the smallest or sets the weighting factor of the viewpoint image with the greatest evaluated contrast value to be the largest.

If necessary, in an area other than the predetermined area in which the viewpoint moving process is not performed, the viewpoint change processing unit 155 may add the plurality of viewpoint images with the weighting factors (the first weighting factor and the second weighting factor) set to be substantially equal to each other in order not to change a blurring shape of the image-forming optical system and may generate an output image. A method of generating an output image in which the weighting factors (that is, an addition proportion) are changed by a user's operation will be described later, but a predetermined area in which the viewpoint moving process is performed may be designated by the user.

(Viewpoint Moving Process for Pupil Shift)

Figure 15C:
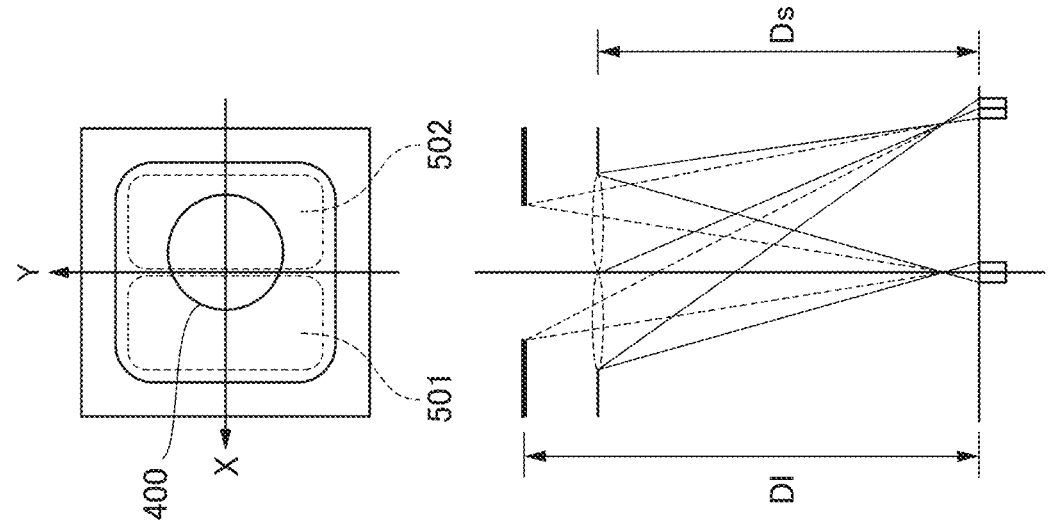
FIGS. 15A to 15C are diagrams illustrating pupil shift in an imaging element with a high resolution at the periphery.
Figure 15B:
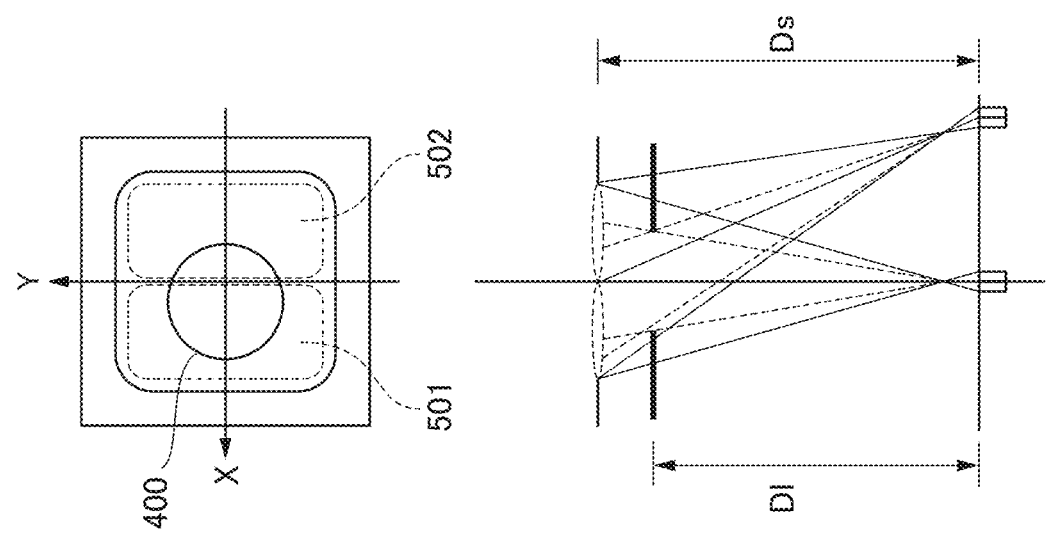
Figure 15A:
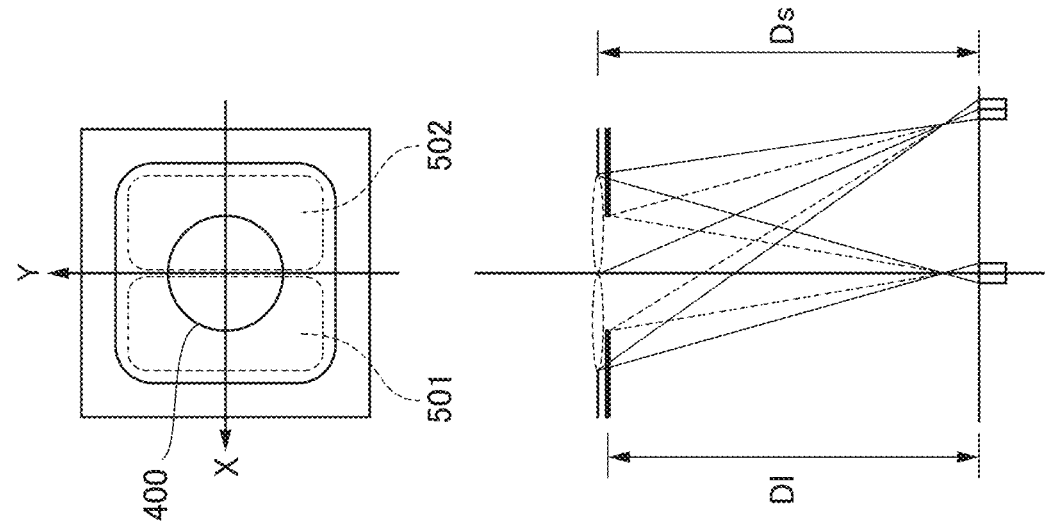

A pupil shift with a high resolution at the periphery of the imaging element 107 will be described below. FIGS. 15A to 15C illustrate a relationship between the pupil subareas (501 and 502) from which the subpixel 201 and the subpixel 202 of each pixel and the exit pupil 400 of the image-forming optical system.

FIG. 15A illustrates a case in which an exit pupil distance Dl of the image-forming optical system and a set pupil distance Ds of the imaging element 107 are equal to each other. In the case with a high resolution at the center, the exit pupil 400 of the image-forming optical system is also substantially equally split by the pupil subarea 501 and the pupil subarea 502 similarly to the case in which a high resolution at the periphery.

On the other hand, FIG. 15B illustrates a case in which the exit pupil distance Dl of the image-forming optical system is less than the set pupil distance Ds of the imaging element 107. In this case, with a high resolution at the periphery, the exit pupil 400 of the image-forming optical system is unequally split by the pupil subarea 501 and the pupil subarea 502. In the example illustrated in FIG. 15B, the effective aperture value of the first viewpoint image corresponding to the pupil subarea 501 is less (brighter) than the effective aperture value of the second viewpoint image corresponding to the pupil subarea 502. With a high resolution at the opposite side (not illustrated), the effective aperture value of the first viewpoint image corresponding to the pupil subarea 501 is greater (darker) than the effective aperture value of the second viewpoint image corresponding to the pupil subarea 502.

FIG. 15C illustrates a case in which the exit pupil distance Dl of the image-forming optical system is longer than the set pupil distance Ds of the imaging element 107. In this case, with a high resolution at the periphery, the exit pupil 400 of the image-forming optical system is unequally split by the pupil subarea 501 and the pupil subarea 502. In the example illustrated in FIG. 15C, the effective aperture value of the first viewpoint image corresponding to the pupil subarea 501 is greater (darker) than the effective aperture value of the second viewpoint image corresponding to the pupil subarea 502. With a high resolution at the opposite side (not illustrated), the effective aperture value of the first viewpoint image corresponding to the pupil subarea 501 is less (brighter) than the effective aperture value of the second viewpoint image corresponding to the pupil subarea 502.

That is, with unequal pupil split with a high resolution at the periphery due to the pupil shift, the effective F values of the first viewpoint image and the second viewpoint image are not equal. Accordingly, diffusion of blurring in one of the first viewpoint image and the second viewpoint image is the greater and diffusion of blurring in the other is the less. Accordingly, if necessary, the viewpoint change processing unit 155 preferably sets the weighting factor of the viewpoint image with the smallest effective aperture value to be the smallest in a predetermined area of the output image or sets the weighting factor of the viewpoint image with the largest effective aperture value to be the largest. By performing this viewpoint moving process, it is possible to reduce covering of the main subject with the near-side blurring.

(Field Depth Enlarging Process)

A depth enlarging process which is performed by the viewpoint change processing unit 155 will be described below with reference back to FIGS. 14A to 14C. As described above, in FIG. 14B, an image passing through the pupil subarea 501 is the first viewpoint image, and an image passing through the pupil subarea 502 is the second viewpoint image. As can be clearly seen from the drawings, since each viewpoint image is an image obtained by passing through a half of the original pupil area, the aperture diameter in the horizontal direction is half when the pupil area is split into two subareas in the horizontal direction. Accordingly, the depth of field in the horizontal direction becomes four times. On the other hand, in this embodiment, since the pupil area is not split in the vertical direction, the depth of field in the vertical direction does not change. Accordingly, the first viewpoint image or the second viewpoint image is an image with the depth of field which doubles the depth of field of the image (A+B image) obtained by combining the first viewpoint image and the second viewpoint image in terms of a vertical and horizontal average.

In this way, the viewpoint change processing unit 155 can generate an image of which the depth of field is enlarged by changing the addition proportion of the first viewpoint image or the second viewpoint image to be other than 1:1 and generating a combined image. The viewpoint change processing unit 155 applies the unsharpening mask processing using the contrast distribution and the image shift distribution to the image in which the addition proportion of the first viewpoint image or the second viewpoint image has changed. Accordingly, it is possible to enlarge the depth of field and to generate a combined image in which the edge has been reinforced. In the depth enlarging process, similarly to the viewpoint moving process, the predetermined area may be processed by a user's operation. When the image combined from the viewpoint images is output from the viewpoint change processing unit 155, the above-mentioned developing process is performed and an image subjected to the developing process is output from the image processing unit 125.

Figure 16:
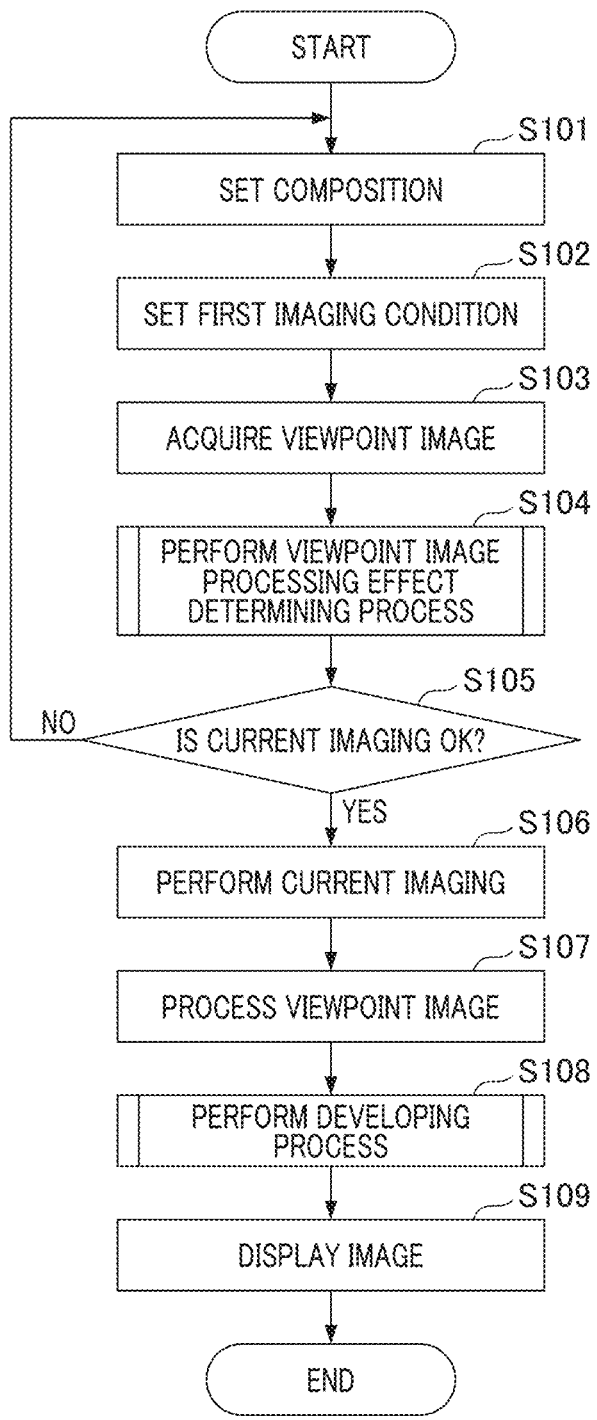
FIG. 16 is a main flowchart.

A process flow according to this embodiment will be described below with reference to FIG. 16. First, in Step S101, a composition with which an image is captured is set by a user, and then the process flow transitions to Step S102. Then, in Step S102, a first imaging condition is set for the composition set in Step S101, and then the process flow transitions to Step S103. Here, the first imaging condition includes an aperture value, a shutter speed, an ISO sensitivity, and a focal distance, and a value calculated by automatically setting exposure depending on brightness of a subject is set or a value is manually set by the user as a method of setting the imaging condition. Then, in Step S103, viewpoint images are acquired, and then the process transitions to Step S104. In Step S103, viewpoint images are not necessarily acquired, and the process flow may be performed by setting a second imaging condition which will be described later from the above-mentioned first imaging condition.

Then, in Step S104, a process of determining whether there is an effect of the viewpoint image processing (image change between before and after the image processing) is performed. Details of the process will be described later with reference to the sub flowcharts illustrated in FIGS. 17 and 18. The process of determining an effect of the viewpoint image processing in Step S104 is not necessary, and the process may be performed by setting a second imaging condition which will be described later from the above-mentioned first imaging condition. Then, in Step S105, it is determined whether current imaging is OK or whether current imaging is to be performed using the first imaging condition or the second imaging condition. The process flow transitions to Step S106 when the current imaging is OK, and returns to Step S101 when the current imaging is NG.

Figure 19:
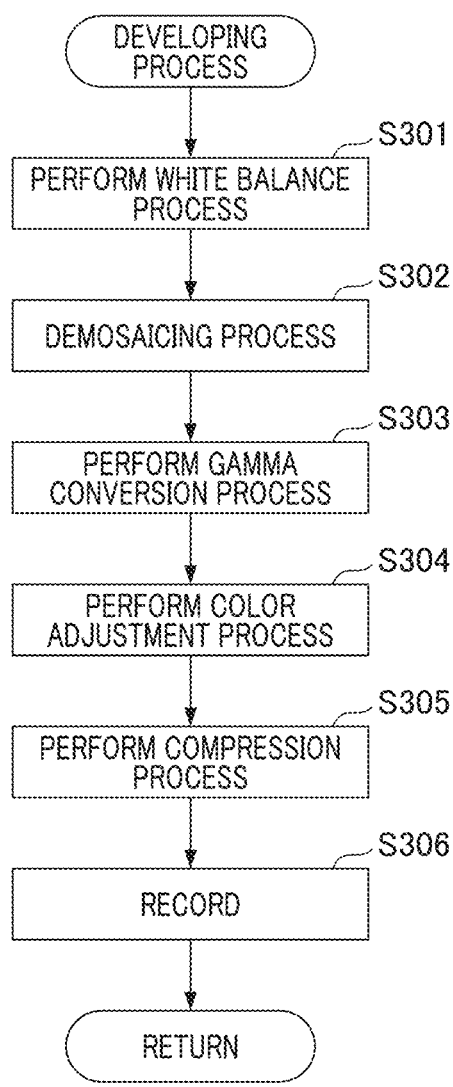
FIG. 19 is a flowchart illustrating a sequence of operations of a developing process.

Then, in Step S106, the current imaging is performed to acquire a plurality of viewpoint images, and then the process flow transitions to Step S107. In Step S107, the viewpoint image processing which is the refocusing process or the viewpoint changing process is performed, and then the process flow transitions to Step S108. The viewpoint image processing may be performed by the imaging device or may be performed by another image processing device such as a PC. Then, in Step S108, the developing process is performed, and then the process flow transitions to Step S109. The developing process will be described later with reference to FIG. 19. Then, in Step S109, the image subjected to the developing process in Step S108 is displayed and then the process flow ends.

Figure 17:
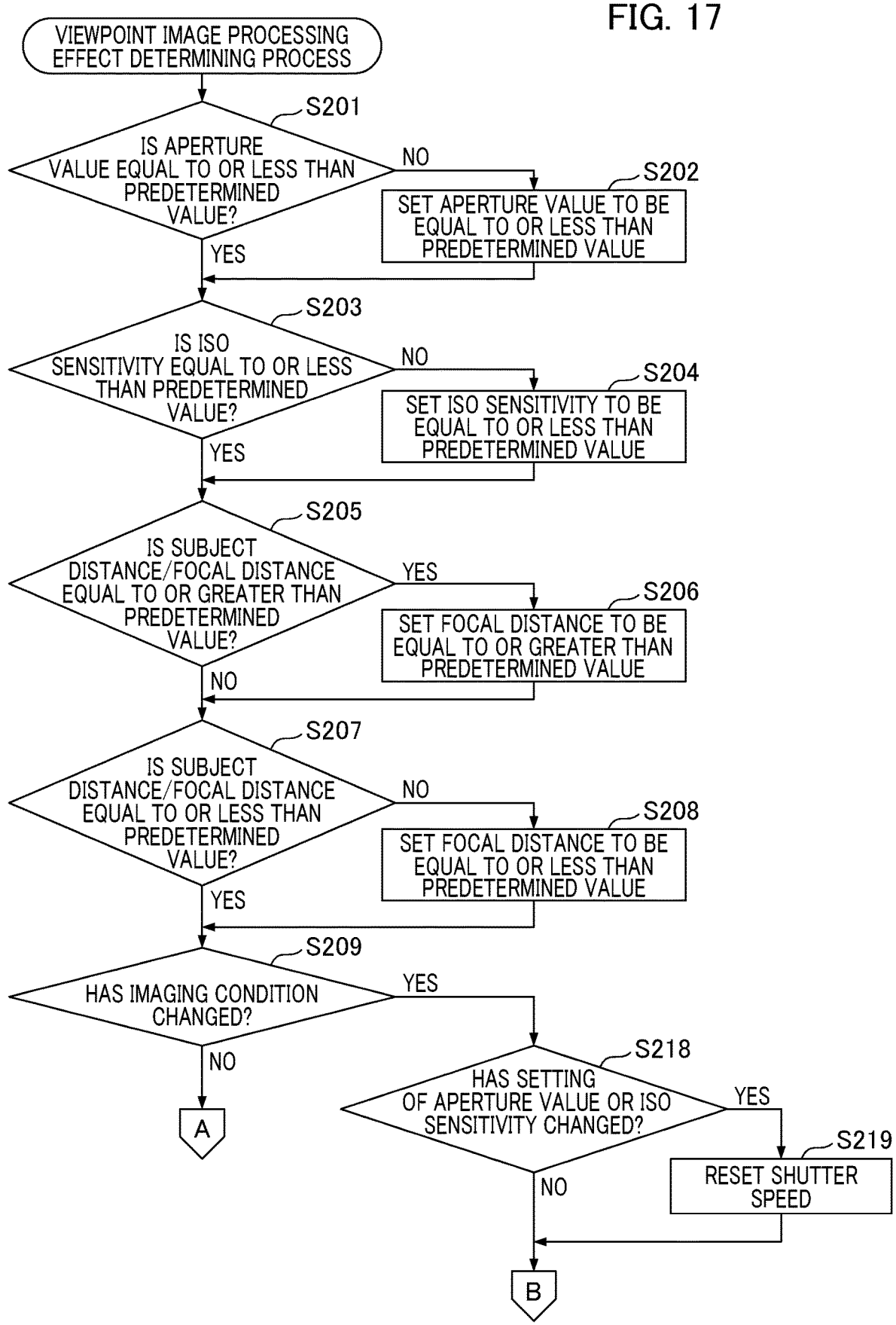
FIG. 17 is a flowchart illustrating a sequence of operations of a viewpoint image processing effect determining process.
Figure 18:
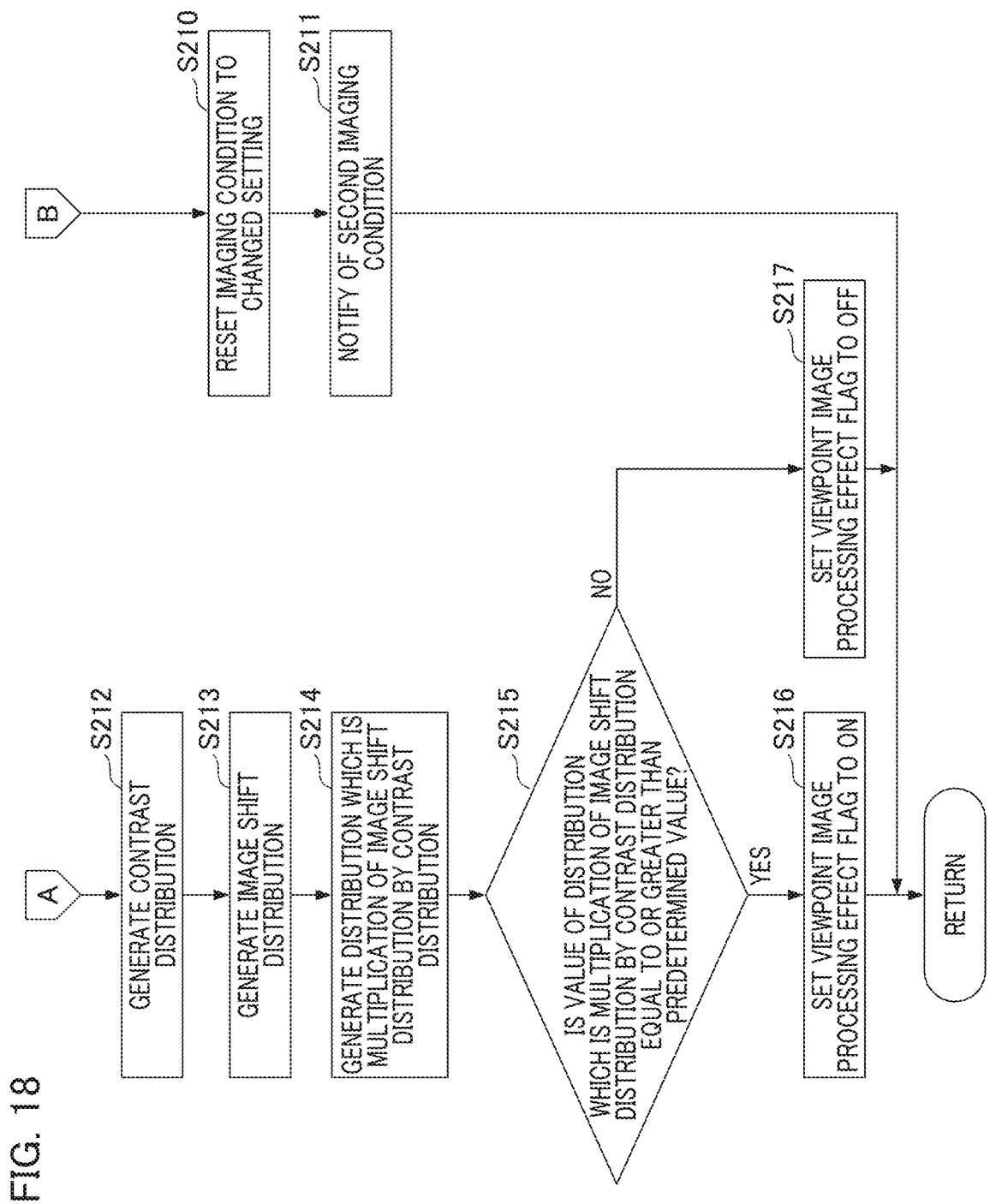
FIG. 18 is a flowchart illustrating a sequence of operations of a viewpoint image processing effect determining process.

The process of determining an effect of the viewpoint image processing will be described below with reference to FIGS. 17 and 18. First, in Step S201, it is determined whether the aperture value is equal to or less than a predetermined value. The process flow transitions to Step S203 when the aperture value is equal to or less than the predetermined value, and transitions to Step S202 when the aperture value is greater than the predetermined value. Here, as the aperture value increases, the parallax between the first viewpoint image and the second viewpoint image decreases and thus the effect of the image processing decreases. Accordingly, the predetermined value (for example, F8) is set to perform the determination. Then, in Step S202, the aperture value is set to be equal to or less than the predetermined value in order to set an aperture value with which the effect of the viewpoint image processing is easily visually recognized, and then the process flow transitions to Step S203.

Then, in Step S203, it is determined whether the ISO sensitivity is equal to or less than a predetermined value. The process flow transitions to Step S205 when the ISO sensitivity is equal to or less than the predetermined value, and transitions to Step S204 when the ISO sensitivity is greater than the predetermined value. Here, as the ISO sensitivity increases, the S/N ratio decreases ad thus the effect of the viewpoint image processing is less easily visually recognized. Accordingly, the ISO sensitivity is preferably equal to or less than the predetermined value (for example, ISO6400). Then, in Step S204, the ISO sensitivity is set to be equal to or less than the predetermined value, and then the process flow transitions to Step S205. In Step S205, it is determined whether the subject distance/focal distance (the value of division of the subject distance by the focal distance) is equal to or greater than a predetermined value. The process flow transitions to Step S206 when the subject distance/focal distance is equal to or greater than the predetermined value, and transitions to Step S207 when the subject distance/focal distance is less than the predetermined value. Regarding the subject distance, a value of the defocus value converted in terms of an actual distance in the refocusing process is proportional to a vertical magnification (a square of a horizontal magnification). Accordingly, in a short-distance subject in which the subject distance/focal distance is small, the value of the defocus value change converted in terms of an actual distance in the refocusing process is small and thus the effect is not easily visually recognized.

Accordingly, it is determined whether the subject distance/focal distance is equal to or greater than the predetermined value (for example, 30). Then, in Step S206, the focal distance is set to be equal to or greater than a predetermined value (for example, 50 mm), and then the process flow transitions to Step S207. Then, in Step S207, it is determined whether the subject distance/focal distance is equal to or less than a predetermined value. The process flow transitions to Step S209 when the subject distance/focal distance is equal to or less than the predetermined value, and transitions to Step S208 when the subject distance/focal distance is greater than the predetermined value. Here, in a long-distance subject of which the subject distance/focal distance is great, the value of the defocus value change converted in terms of an actual distance in the refocusing process is great. Accordingly, the change of the focal position for the subject in the refocusing process is greater and thus the focal position cannot be finely adjusted. Accordingly, it is determined whether the subject distance/focal distance is equal to or less than the predetermined value (for example, 200). Then, in Step S208, the focal distance is set to be equal to or less than a predetermined value (for example, 300 mm) and then the process flow transitions to Step S209.

Then, in Step S209, it is determined whether the imaging condition has changed on the basis of the above-mentioned determination conditions. The process flow transitions to Step S218 when the imaging condition has changed, and transitions to Step S212 when the imaging condition has not changed. Then, in Step S218, it is determined whether setting of the aperture value or the ISO sensitivity has changed. This is because, when the setting of the aperture value has changed in Step S202 and the setting of the ISO sensitivity has changed in Step S204, it is necessary to change the shutter speed for the purpose of appropriate exposure. The process flow transitions to Step S210 when it is determined in Step S218 that the setting of the aperture value or the ISO sensitivity has changed, and transitions to Step S219 when the setting has not changed. Then, in Step S219, the shutter speed is changed (reset) for the purpose of appropriate exposure, and then the process flow transitions to Step S210. Then, in Step S210, the imaging condition of which the setting has changed is set as the second imaging condition, and then the process flow transitions to Step S211. Then, in Step S211, in order to notify of the second imaging condition, the second imaging condition is displayed on the display unit to notify the user, and then the process flow ends. Notification of the second imaging condition may be performed during a live view operation of sequentially acquiring an image.

Then, in Step S212, the contrast distribution is generated, and then the process flow transitions to Step S213. Then, in Step S202, the image shift distribution is generated, and then the process flow transitions to S214. Then, in Step S214, the image shift distribution is normalized such that the image shift value of a subject has a maximum value, a distribution obtained by multiplying the normalized image shift distribution by the contrast distribution is generated, and then the process flow transitions to Step S215. Then, in Step S215, it is determined whether a value of the distribution obtained by multiplying the image shift distribution by the contrast distribution is equal to or greater than a predetermined value. The process flow transitions to Step S216 when the value of the resultant distribution is equal to or greater than the predetermined value, and transitions to Step S217 when the value of the resultant distribution is less than the predetermined value. Then, in Step S216, a viewpoint image processing effect flag is set to ON, and the process flow ends. Then, in Step S217, the viewpoint image processing effect flag is set to OFF, the process of determining the effect of the viewpoint image processing ends, and the process flow returns to the main flow.

(Sequence of Operations Associated with Developing Process)

The developing process in S108 will be described below with reference to FIG. 18. First, in Step S301, the image processing unit 125 gives gains to the colors of R. G, and B and performs a white balance process such that the colors of R, G, and B in a white area is isochromatic. Then, in Step S302, the image processing unit 125 performs the demosaicing process. Specifically, the image processing unit 125 generates color image signals of the three primary colors of R, G, and B as an interpolation process result for each pixel by performing interpolation on an input image in prescribed directions and then selecting a direction.

Then, in Step S303, the image processing unit 125 performs gamma processing. Then, in Step S304, the image processing unit 125 performs various color adjustment processes such as noise reduction, saturation enhancement, hue correction, and edge reinforcement in order to improve an appearance of an image. Then, in Step S305, the image processing unit 125 compresses the color image signals which has been color-adjusted in Step S304 in a predetermined system such as JPEG, and outputs compressed image data. Then, in Step S306, the control unit 121 records the image data output from the image processing unit 125 on a recording medium 133, ends a sequence of operations associated with the developing process, and returns the process flow to the caller.

According to the present embodiment, it is possible to provide an image processing device that can notify whether there is an effect of emphasizing a subject close to a focal point in contrast with a blurred foreground or background before performing imaging.

Second Embodiment

A second embodiment is different from the first embodiment, in that an imaging element in which each pixel is split into two subpixels in the horizontal direction and the vertical direction. Accordingly, since the other configuration of a digital camera 100 is the same as in the first embodiment, the same elements will be referred to by the same reference signs, description thereof will not be repeated, and the difference will be mainly described below.

Figure 20:
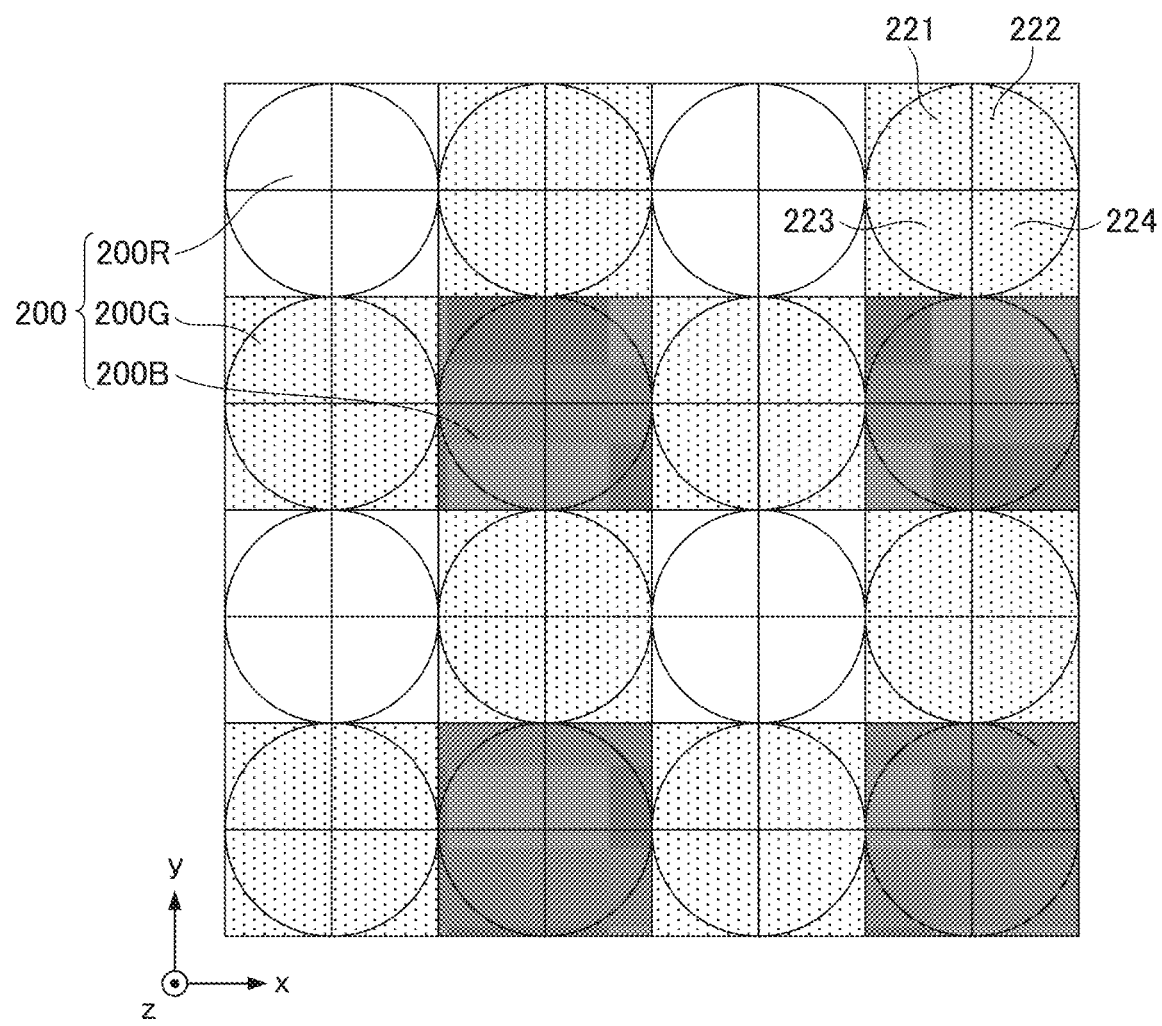
FIG. 20 is a diagram schematically illustrating a pixel array.

An array of pixels and subpixels of an imaging element 107 according to this embodiment will be described below with reference to FIG. 20. FIG. 20 illustrates a pixel array in in a range of four columns×four rows in the imaging element 107 according to this embodiment and illustrates a subpixel array in a range of eight columns×eight rows. In a pixel group 200 of two columns×two rows illustrated in FIG. 20, a pixel 200R having a spectral sensitivity of R (red) is disposed at an upper-left position, pixels 200G having a spectral sensitivity of G (green) are disposed at upper-right and lower-left positions, and a pixel 20B having a spectral sensitivity of B (blue) is disposed at a lower-right position. Each pixel includes subpixels 221 to 224 which are arranged in two columns×two rows.

By arranging a plurality of pixels of four columns×four rows (subpixels of eight columns×eight rows) illustrated in FIG. 20 in a two-dimensional shape, the imaging element 107 can acquire a captured image (subpixel signals). In the imaging element 107, for example, a period P of pixels is 4 µm, the number of pixels N is 5575 columns×3725 rows=about 20,750,000 pixels, a period PSUM of subpixels is 2 µm, and the number of subpixels NSUB is 11150 columns×7450 rows=about 83,000,000 pixels.

Figure 21A:
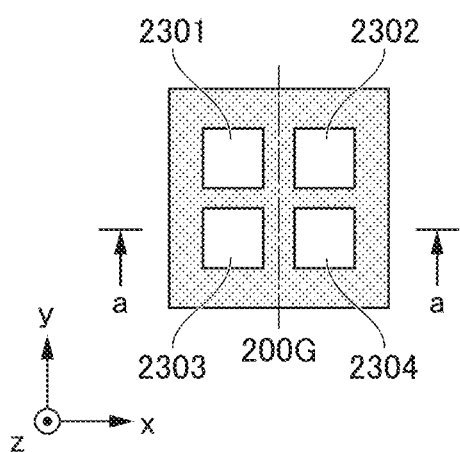
FIGS. 21A and 21B area plan view and a sectional view schematically illustrating a pixel.
Figure 21B:
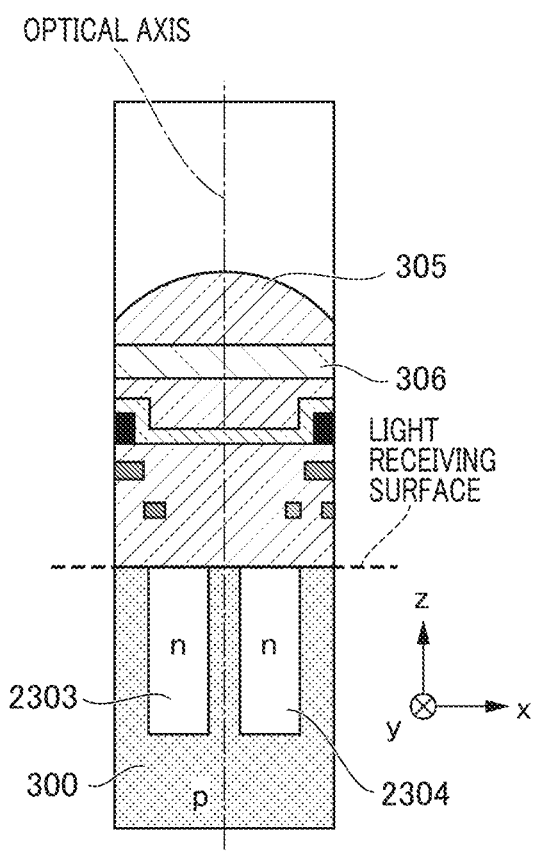

A plan view of one pixel 200G illustrated in FIG. 20 when seen from a light receiving surface side (the +z side) of the imaging element 107 is illustrated in FIG. 21A. A sectional view taken along line a-a in FIG. 21A when seen from the −y side is illustrated in FIG. 21B. As illustrated in FIG. 21A, in the pixel 200G according to this embodiment, photoelectric conversion portions 2301 to 2304 which are split into NH parts (two parts) in the x direction and split into NV parts (two parts) in the y direction are formed. The photoelectric conversion portions 2301 to 2304 correspond to subpixels 221 to 224.

In this embodiment, a first viewpoint image is generated by collecting light reception signals of the subpixels 201 of the pixels. Similarly, a second viewpoint image is generated by collecting light reception signals of the subpixels 202 of the pixels, a third viewpoint image is generated by collecting light reception signals of the subpixels 203 of the pixels, and a fourth viewpoint image is generated by collecting light reception signals of the subpixels 204 of the pixels. In this embodiment, the first to fourth viewpoint images are images having a Bayer array, and the demosaicing process may be performed on the first to fourth viewpoint images if necessary.

In the following description, j and i are assumed to be integers, a position of the j-th in the row direction and the i-th in the column direction in the imaging element 107 is defined as (j, i), a first viewpoint image of a pixel located at the position (j, i) is expressed as $A0(j, i)$, a second viewpoint image is expressed as $B0(j, i)$, a third viewpoint image is expressed as $C0(j, i)$, and a fourth viewpoint image is expressed as $D0(j, i)$. At this time, a captured image I is expressed as $I(j, i)=A0(j, i)+B0(j, i)+C0(j, i)+D0(j, i)$.

(Viewpoint Image Correction and Refocusing)

Similarly to the first embodiment, the viewpoint change processing unit 155 performs contrast processing. That is, in the captured image $I(j, i)$ with the Bayer array, a luminance $Y(j, i)$ is calculated using Equation (1). The viewpoint change processing unit 155 calculates a high-frequency component $dY(j, i)$, a high-frequency component $dZ(j, i)$, and a contrast distribution $C(j, i)$.

Then, the viewpoint change processing unit 155 performs a parallax enhancement process on the viewpoint images. The viewpoint change processing unit 155 performs conversion of enlarging a difference between the viewpoint images using Equations (15) and (16) and enhancing the parallax on the first to fourth viewpoint images $A0(j, i)$ to $D0(j, i)$. The viewpoint change processing unit 155 generates first to fourth corrected viewpoint images $A(j, i)$ to $D(j, i)$ through this process. Here, kAB, kAC, kAD, kBC, kBD, and kCD are real numbers satisfying $0 \leq kAB, kAC, kAD, kBC, kBD, kCD \leq 1$.

$$\begin{pmatrix} A_1 \\ B_1 \\ C_1 \\ D_1 \end{pmatrix} = \begin{pmatrix} 1-k_{AB}-k_{AC}-k_{AD} & k_{AB} & k_{AC} & k_{AD} \\ k_{AB} & 1-k_{AB}-k_{BC}-k_{BD} & k_{BC} & k_{BD} \\ k_{AC} & k_{BC} & 1-k_{AC}-k_{BC}-k_{CD} & k_{CD} \\ k_{AD} & k_{BD} & k_{CD} & 1-k_{AD}-k_{BD}-k_{CD} \end{pmatrix}^{-1} \begin{pmatrix} A_0 \\ B_0 \\ C_0 \\ D_0 \end{pmatrix} \quad (15)$$

$$A(j,i) = \frac{|A_1(j,i)| + A_1(j,i)}{2}, \quad (16)$$

$$B(j,i) = \frac{|B_1(j,i)| + B_1(j,i)}{2},$$

$$C(j,i) = \frac{|C_1(j,i)| + C_1(j,i)}{2},$$

$$D(j,i) = \frac{|D_1(j,i)| + D_1(j,i)}{2},$$

The refocus processing unit 156 performs a refocusing process using the corrected viewpoint images output from the viewpoint change processing unit 155. Specifically, the refocus processing unit 156 shifts and adds the first to fourth corrected viewpoint images A to D using Equation (17) using an integer shift value s.

$$I(j,I;s)=A(j,i)+B(j,i+s)+C(j+s,i)+D(j+s,i+s) \quad (17)$$

That is, a refocused image I(j, I; s) on the virtual image-forming plane based on the integer shift value s can be generated. Since the first to fourth corrected viewpoint images A to D are formed in a Bayer array, shifting and addition based on Equation (10) for each color is performed using a shift value s=2n (where n is an integer) which is a multiple of 2, and a refocused image I(j, I; s) is generated with the Bayer array maintained. The image processing unit 125 performs a demosaicing process on the generated refocused image I(j, I; s).

If necessary, the refocus processing unit 156 may perform the demosaicing process on the first to fourth corrected viewpoint images A to D and perform the shifting and addition process on the first to fourth corrected viewpoint images subjected to the demosaicing process to generate the refocused image. If necessary, the refocus processing unit 156 may generate an interpolation signal between the pixels of the first to fourth corrected viewpoint images and generate a refocused image based on a non-integer shift value.

(Image Shift Distribution)

An image shift distribution of viewpoint images in this embodiment will be described below. The image shift distribution in the pupil split direction in the horizontal direction is the same as in the first embodiment and thus will not be repeated, and the image shift distribution in the pupil split direction in the vertical direction will be described. The viewpoint change processing unit 155 moves a two-dimensional image by k pixels in only the pupil split direction in the vertical direction and takes a difference between the first viewpoint image A0 and the third viewpoint image C0. Accordingly, a correlation operation equation applied to a plurality of rows is defined as Equation (18).

$$k \geq 0 \; COR'(k) = \sum_j^{nj} \sum_i^{ni} |A0_{i(j+k)} - C0_{ij}| \quad (18)$$

$$k < 0 \; COR'(k) = \sum_j^{nj} \sum_i^{ni} |A0_{ij} - C0_{i(j+k)}|$$

Here, $A0_{ij}$ and $C0_{ij}$ denote luminances of the j-th and i-th pixels of the first viewpoint image A0 and the third viewpoint image C0. Here, ni is a numeral denoting the number of pixels which are used for the arithmetic operation and nj is the number of pixels in the column direction of a pair of images which are subjected to the correlation operation.

The viewpoint change processing unit 155 calculates k at which COR'(k) in Equation (18) is minimized as the image shift value. Subscript k is added to only j and is regardless of i. This means that the correlation operation is performed while the two-dimensional image is being moved in only the pupil split direction in the vertical direction. In this way, the viewpoint change processing unit 155 can calculate the image shift value of each area in the first viewpoint image A0 and the third viewpoint image C0 and thus calculate an image shift distribution. In this embodiment, A0 and C0 are used, but the correlation operation may be performed using B0 and D0 or the correlation operation may be performed using a signal obtained by adding A0 and B0 and a signal obtained by adding C0 and D0.

(Field Depth Enlarging Process)

The viewpoint change processing unit 155 calculates weighting factors of the viewpoint images based on Equations (19A) to (19D) using a real coefficient w ($-1 \leq w \leq 1$).

$$W_a(j,i)=1+w_aT(j,i), \quad (19A)$$

$$W_b(j,i)=1+w_bT(j,i), \quad (19B)$$

$$W_c(j,i)=1+w_cT(j,i), \quad (19C)$$

$$W_d(j,i)=1+w_dT(j,i), \quad (19D)$$

Here, $W_a(j, i)$ is a first weighting factor of the first viewpoint image A(j, i), $W_b(j, i)$ is a second weighting factor of the second viewpoint image B(j, i), $W_c(j, i)$ is a third weighting factor of the third viewpoint image C(j, i), and $W_d(j, i)$ is a fourth weighting factor of the fourth viewpoint image D(j, i).

The viewpoint change processing unit 155 generates an output image I(j, i) based on Equation (20) using the weighting factors corresponding to the viewpoint images.

$$I(j,i)=W_a(j,i)*A(j,i)+W_b(j,i)*B(j,i)+W_c(j,i)*C(j,i)+W_d(j,i)*D(j,i) \quad (20)$$

According to this embodiment, it is possible to provide an image processing device that can notify whether there is an effect of emphasizing a subject close to a focal point in contrast with a blurred foreground or background before performing imaging.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198015, filed Oct. 11, 2017 which is hereby incorporated by reference wherein in its entirety.

What is claimed is:

1. An image processing device comprising:
at least one processor and at least one memory functioning as:
an acquisition unit that acquires a plurality of viewpoint images which are captured at a plurality of different viewpoints by an imaging unit;
a detection unit that detects viewpoint-relevant information between the plurality of viewpoint images;
a determination unit that determines a second imaging condition in which image change between before and after predetermined image processing is greater than that in a first imaging condition in which the plurality of viewpoint images are captured on the basis of the first imaging condition and the viewpoint-relevant information; and
an output unit that outputs the second imaging condition determined by the determination unit,
wherein the determination unit determines the aperture value to be less in the second imaging condition than in the first imaging condition when the aperture value in the first imaging condition is equal to or greater than a predetermined value.

2. The image processing device according to claim 1, wherein the imaging condition includes at least one of an aperture value, an ISO sensitivity, and a value of division of a subject distance by a focal distance.

3. The image processing device according to claim 1, wherein the determination unit determines the ISO sensitivity to be less in the second imaging condition than in the first imaging condition when the ISO sensitivity in the first imaging condition is equal to or greater than a predetermined value.

4. The image processing device according to claim 1, wherein the determination unit determines the focal distance to be less than in the second imaging condition than in the first imaging condition when the value of division of the subject distance by the focal distance in the first imaging condition is equal to or greater than a first predetermined value.

5. The image processing device according to claim 1, wherein the determination unit determines the focal distance to be greater in the second imaging condition than in the first imaging condition when the value of division of the subject distance by the focal distance in the first imaging condition is equal to or greater than a second predetermined value.

6. The image processing device according to claim 1, wherein the output unit notifies a user of the second imaging condition during a live-view operation of sequentially acquiring images from the acquisition unit.

7. The image processing device according to claim 1, further comprising:
a control unit that controls the imaging unit on the basis of the second imaging condition output from the output unit.

8. The image processing device according to claim 1, wherein the predetermined image processing includes at least one of resolution correction, blurring shift, and ghost reduction.

9. The image processing device according to claim 1, wherein the viewpoint-relevant information includes information of an image shift distribution which is acquired from the plurality of viewpoint images.

10. The image processing device according to claim 1, wherein the viewpoint-relevant information includes information of a contrast distribution which is acquired from the plurality of viewpoint images.

11. A control method for an image processing device, the method comprising:
acquiring a plurality of viewpoint images which are captured at a plurality of different viewpoints by an imaging unit;
detecting viewpoint-relevant information between the plurality of viewpoint images;
determining a second imaging condition in which image change between before and after predetermined image processing is greater than that in a first imaging condition in which the plurality of viewpoint images are captured on the basis of the first imaging condition and the viewpoint-relevant information; and
outputting the second imaging condition determined in the determining of the second imaging condition;
wherein the determining step determines the aperture value to be less in the second imaging condition than in the first imaging condition when the aperture value in the first imaging condition is equal to or greater than a predetermined value.

12. A non-transitory readable storage medium which stores a program causing a computer to execute a control method for an image processing device, the method comprising:
acquiring a plurality of viewpoint images which are captured at a plurality of different viewpoints by an imaging unit;
detecting viewpoint-relevant information between the plurality of viewpoint images;
determining a second imaging condition in which image change between before and after predetermined image processing is greater than that in a first imaging condition in which the plurality of viewpoint images are captured on the basis of the first imaging condition and the viewpoint-relevant information; and
outputting the second imaging condition determined in the determining of the second imaging condition;
wherein the determining step determines the aperture value to be less in the second imaging condition than in the first imaging condition when the aperture value in the first imaging condition is equal to or greater than a predetermined value.

13. An image processing device comprising:
at least one processor and at least one memory functioning as:
an acquisition unit that acquires a plurality of viewpoint images which are captured at a plurality of different viewpoints by an imaging unit;
a detection unit that detects viewpoint-relevant information between the plurality of viewpoint images;
a determination unit that determines a second imaging condition in which image change between before and after predetermined image processing is greater than that in a first imaging condition in which the plurality of viewpoint images are captured on the basis of the first imaging condition and the viewpoint-relevant information;
an output unit that outputs the second imaging condition determined by the determination unit, and
wherein the determination unit determines the ISO sensitivity to be less in the second imaging condition than in the first imaging condition when the ISO sensitivity in the first imaging condition is equal to or greater than a predetermined value.

14. The image processing device according to claim 13, wherein the determination unit determines the focal distance to be less than in the second imaging condition than in the first imaging condition when the value of division of the subject distance by the focal distance in the first imaging condition is equal to or greater than a first predetermined value.

15. A control method for an image processing device, the method comprising:
  acquiring a plurality of viewpoint images which are captured at a plurality of different viewpoints by an imaging unit;
  detecting viewpoint-relevant information between the plurality of viewpoint images;
  determining a second imaging condition in which image change between before and after predetermined image processing is greater than that in a first imaging condition in which the plurality of viewpoint images are captured on the basis of the first imaging condition and the viewpoint-relevant information; and
  outputting the second imaging condition determined by the determining step,
  wherein the determining step determines the ISO sensitivity to be less in the second imaging condition than in the first imaging condition when the ISO sensitivity in the first imaging condition is equal to or greater than a predetermined value.

16. The control method according to claim 15, wherein the determining step determines the focal distance to be less than in the second imaging condition than in the first imaging condition when the value of division of the subject distance by the focal distance in the first imaging condition is equal to or greater than a first predetermined value.

17. An image processing device comprising:
  at least one processor and at least one memory functioning as:
    an acquisition unit that acquires a plurality of viewpoint images which are captured at a plurality of different viewpoints by an imaging unit;
    a detection unit that detects viewpoint-relevant information between the plurality of viewpoint images;
    a determination unit that determines a second imaging condition in which image change between before and after predetermined image processing is greater than that in a first imaging condition in which the plurality of viewpoint images are captured on the basis of the first imaging condition and the viewpoint-relevant information;
    an output unit that outputs the second imaging condition determined by the determination unit, and
  wherein the determination unit determines the focal distance to be greater in the second imaging condition than in the first imaging condition when the value of division of the subject distance by the focal distance in the first imaging condition is equal to or greater than a second predetermined value.

18. A control method for an image processing device, the method comprising:
  acquiring a plurality of viewpoint images which are captured at a plurality of different viewpoints by an imaging unit;
  detecting viewpoint-relevant information between the plurality of viewpoint images;
  determining a second imaging condition in which image change between before and after predetermined image processing is greater than that in a first imaging condition in which the plurality of viewpoint images are captured on the basis of the first imaging condition and the viewpoint-relevant information; and
  outputting the second imaging condition determined by the determining step, wherein the determining step determines the focal distance to be greater in the second imaging condition than in the first imaging condition when the value of division of the subject distance by the focal distance in the first imaging condition is equal to or greater than a second predetermined value.

* * * * *